T

United States Patent
Ohara et al.

(10) Patent No.: US 11,597,874 B2
(45) Date of Patent: Mar. 7, 2023

(54) PHOTOCHROMIC CURABLE COMPOSITION

(71) Applicant: TOKUYAMA CORPORATION, Shunan (JP)

(72) Inventors: Ayako Ohara, Shunan (JP); Junji Takenaka, Shunan (JP); Junji Momoda, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 0 days.

(21) Appl. No.: 16/982,735

(22) PCT Filed: Mar. 22, 2019

(86) PCT No.: PCT/JP2019/011988
§ 371 (c)(1),
(2) Date: Sep. 21, 2020

(87) PCT Pub. No.: WO2019/182085
PCT Pub. Date: Sep. 26, 2019

(65) Prior Publication Data
US 2021/0002545 A1    Jan. 7, 2021

(30) Foreign Application Priority Data

Mar. 23, 2018    (JP) .............................. JP2018-056089

(51) Int. Cl.
| | | |
|---|---|---|
| *C09K 9/02* | (2006.01) | |
| *C08F 222/10* | (2006.01) | |
| *C08K 5/46* | (2006.01) | |
| *G02B 1/14* | (2015.01) | |
| *C08K 5/357* | (2006.01) | |
| *C08K 5/378* | (2006.01) | |
| *G02B 5/23* | (2006.01) | |

(52) U.S. Cl.
CPC ............ *C09K 9/02* (2013.01); *C08F 222/102* (2020.02); *C08K 5/357* (2013.01); *C08K 5/378* (2013.01); *C08K 5/46* (2013.01); *G02B 1/14* (2015.01); *G02B 5/23* (2013.01); *C09K 2211/1007* (2013.01); *C09K 2211/1014* (2013.01); *C09K 2211/1018* (2013.01)

(58) Field of Classification Search
CPC .............. C09K 9/02; C09K 2211/1014; C09K 2211/1007; C09K 2211/1018; C09K 5/46; C09K 5/357; C09K 5/378; C08F 222/102; G02B 1/14; G02B 5/23
See application file for complete search history.

(56) References Cited

U.S. PATENT DOCUMENTS

| | | |
|---|---|---|
| 2004/0220292 A1 | 11/2004 | Momoda et al. |
| 2006/0099497 A1* | 5/2006 | Uetani .................... B32B 27/08 429/144 |
| 2010/0230650 A1 | 9/2010 | Nagoh et al. |
| 2011/0020648 A1 | 1/2011 | Fukazawa et al. |
| 2013/0015416 A1 | 1/2013 | Takenaka et al. |
| 2014/0107314 A1 | 4/2014 | Kawato et al. |
| 2015/0368552 A1* | 12/2015 | Izumi .................... G02F 1/0063 428/215 |
| 2016/0116765 A1 | 4/2016 | Shimizu et al. |
| 2016/0251520 A1* | 9/2016 | Shimura ............... H05K 1/0373 428/195.1 |
| 2019/0161585 A1 | 5/2019 | Izumi et al. |

FOREIGN PATENT DOCUMENTS

| | | | | |
|---|---|---|---|---|
| JP | 2002037826 A | * | 2/2002 | ............ C08F 220/30 |
| JP | 2007-291359 A | | 11/2007 | |
| JP | 2012-242718 A | | 12/2012 | |
| WO | WO 03/011967 A1 | | 2/2003 | |
| WO | WO 2009/075388 A1 | | 6/2009 | |
| WO | WO 2011/125956 A1 | | 10/2011 | |
| WO | WO 2012/176439 A1 | | 12/2012 | |
| WO | WO 2014/042328 A1 | | 3/2014 | |
| WO | WO-2014042328 A1 | * | 3/2014 | ........... H01L 23/293 |
| WO | WO 2015/005391 A1 | | 1/2015 | |
| WO | WO 2015/068820 A1 | | 5/2015 | |
| WO | WO 2018/030257 A1 | | 2/2018 | |

OTHER PUBLICATIONS

International Search Report issued in PCT/JP2019/011988 (PCT/ISA/210), dated May 14, 2019.
Written Opinion of the International Searching Authority issued in PCT/JP2019/011988 (PCT/ISA/237), dated May 14, 2019.
International Preliminary Report on Patentability and English translation of the Written Opinion of the International Searching Authority (PCT/IB/373 and PCT/ISA/237) dated Sep. 29, 2020 for Application No. PCT/JP2019/011988.
Extended Supplementary European Search Report issued in Application No. 19770521.3 dated Nov. 25, 2021.

* cited by examiner

*Primary Examiner* — Bijan Ahvazi
(74) *Attorney, Agent, or Firm* — Birch, Stewart, Kolasch & Birch, LLP

(57) ABSTRACT

A photochromic curable composition comprising a radically polymerizable monomer having at least one oxetanyl group in one molecule, a photochromic compound and radically polymerizable monomers other than the above polymerizable monomer, and a photochromic cured body obtained by polymerizing the photochromic curable composition.

6 Claims, No Drawings

PHOTOCHROMIC CURABLE COMPOSITION

TECHNICAL FIELD

The present invention relates to a novel photochromic curable composition. Further, it relates to a novel photochromic cured body having an excellent photochromic function.

BACKGROUND ART

Photochromism is a reversible function that a certain compound changes its color swiftly upon exposure to light including ultraviolet light such as sunlight or light from a mercury lamp and returns to its original color when it is put in the dark by stopping its exposure to light and used for various purposes. As a photochromic compound having this property, fulgimide compounds, spirooxazine compounds and chromene compounds have been found. Since optical articles having photochromic properties can be obtained by compounding these compounds with plastics, a large number of studies on composites are now under way.

For example, photochromism is applied in the field of spectacle lenses. Photochromic spectacle lenses comprising a photochromic compound function as sunglasses whose lenses are quickly colored outdoors where they are irradiated with light including ultraviolet light such as sunlight and as ordinary transparent eyeglasses whose lenses are faded indoors where there is no irradiation of the above light, and demand for the photochromic spectacle lenses is growing nowadays.

Plastic photochromic spectacle lenses are particularly preferred from the viewpoints of lightweight and safety, photochromic properties are generally provided to these plastic lenses by compounding the above photochromic compounds, and specifically, the following means are known.
(a) A method in which a photochromic compound is dissolved in a polymerizable monomer and the monomer is polymerized to directly mold an optical material such as a lens. This method is called "kneading method".
(b) A method in which a resin layer containing a photochromic compound dispersed therein is formed on the surface of a plastic molded article such as a lens by coating or cast polymerization. This method is called "lamination method".

There are proposed various techniques for the kneading method (refer to Patent Document 1, Patent Document 2 and Patent Document 3) and various techniques for the lamination method (refer to Patent Document 4 and Patent Document 3).

PRIOR ART DOCUMENTS

Patent Documents

Patent Document 1: WO2012/176439
Patent Document 2: WO2009/075388
Patent Document 3: WO2003/011967
Patent Document 4: WO2011/125956

DISCLOSURE OF THE INVENTION

Problem to be Solved by the Invention

For optical materials such as optical articles provided with photochromic properties, the following properties are required.

(I) The degree of coloration at a visible light region before ultraviolet light is applied (initial coloration) should be low.
(II) The degree of coloration upon exposure to ultraviolet light (color optical density) should be high.
(III) The speed from the stoppage of the application of ultraviolet light to the time when the material returns to its original state (fading speed) should be high.
(IV) The repetitive durability of a reversible function between color development and fading should be high.
(V) Storage stability should be high.
(VI) The optical article should be easily molded, and post-processing such as the formation of a hard coat film should be easy.
(VII) Photochromic properties should be provided without the deterioration of mechanical strength.

Various improvements have been made on photochromic curable compositions comprising a photochromic compound and a radically polymerizable monomer used in the kneading method or the lamination method in order to highly develop the above properties (I) to (VII). For example, there is known a method for improving photochromic properties and adhesion to a hard coat layer by containing a radically polymerizable monomer having a silanol group or a group producing a silanol group by hydrolysis and/or a radically polymerizable monomer having an isocyanate group in a photochromic curable composition (Patent Document 3). Further, a method for improving photochromic properties and adhesion to a hard coat layer by limiting the ratio of an acrylate monomer to a methacrylate monomer in a photochromic curable composition forming a photochromic coat layer is now under study (Patent Document 4). According to these methods, a photochromic cured body having excellent performance can be produced.

However, requirements for photochromic cured bodies are becoming higher and higher, and the development of not only excellent photochromic properties but also more excellent hard coat adhesion is desired.

Patent Document 3 teaches that the durability of a photochromic compound contained in a photochromic cured body can be improved and the performance of the photochromic cured body can be enhanced by blending a radically polymerizable monomer having an epoxy group. In Patent Document 4, it is known that hard coat adhesion can be enhanced by blending a radically polymerizable monomer having an epoxy group. More specifically, in Patent Documents 3 and 4, glycidyl methacrylate (to be simply abbreviated as "GMA" hereinafter) is used as the radically polymerizable monomer having an epoxy group.

However, as described in Patent Document 2, it is known that, when the radically polymerizable monomer having an epoxy group is used in a large amount or in combination with a specific chromene compound, the color of the obtained photochromic cured body changes with the passage of time. Out of the radically polymerizable monomers having an epoxy group, GMA may be a mutagenic and carcinogenic substance, and it is therefore desired that its use should be avoided.

For that reason, without using a radically polymerizable monomer (especially GMA) having an epoxy group, a photochromic cured body having at least the same physical properties as those of a cured body obtained from a curable composition comprising the above radically polymerizable monomer is desired.

The inventors of the present invention conducted intensive studies to solve the above problem. When they first reviewed the role of each polymerizable monomer contained in a photochromic curable composition again, they found that, in the photochromic curable composition, the radically polymerizable monomer having an epoxy group has the function of quenching an acid component which is an impurity and retaining photochromic properties at a high level. Then, the inventors conducted further studies on another polymerizable monomer which can solve the above problem and can be used as a substitute for the radically polymerizable monomer having an epoxy group and found that a photochromic curable composition which provides a cured body solving the above problem can be obtained by using a radically polymerizable monomer having at least one oxetanyl group in the molecule. Further, they found that a temporal change in the color of the obtained photochromic cured body can be suppressed as compared with a case where the radically polymerizable monomer having an epoxy group is used. Thus, the present invention was accomplished based on this finding.

Means for Solving the Problem

It is therefore an object of the present invention to provide a photochromic curable composition comprising a radically polymerizable compound as a substitute for a radically polymerizable compound having an epoxy group, which rarely changes its color, exhibits excellent photochromic properties such as high optical density and high fading speed and has high adhesion to a hard coat layer formed on a photochromic cured body.

Other objects and advantages of the present invention will become apparent from the following description.

That is, the present invention is a photochromic curable composition comprising (A) a radically polymerizable monomer having at least one oxetanyl group in one molecule (may be simply referred to as "component (A)" hereinafter), (B) a photochromic compound (may be simply referred to as "component (B)" hereinafter) and (C) radically polymerizable monomers other than the above component (A) (may be simply referred to as "component (C)" hereinafter).

Effect of the Invention

A cured body obtained by polymerizing the photochromic curable composition of the present invention and a photochromic laminate having the cured body are excellent in not only photochromic properties but also adhesion to a hard coat layer formed on the photochromic cured body.

BEST MODE FOR CARRYING OUT THE INVENTION

Each component of the photochromic curable composition of the present invention is described below.

Component (A)

The present invention is characterized in that a radically polymerizable monomer component having at least one oxetanyl group is contained as the component (A). By blending this component (A), a photochromic cured body and photochromic laminate having excellent photochromic properties and high adhesion to a hard coat can be formed. A description is subsequently given of the component (A).

The component (A) is a radically polymerizable monomer having at least one oxetanyl group in one molecule. Examples of the radically polymerizable group include vinyl group, allyl group, acrylate group and methacrylate group. To obtain excellent photochromic properties, an acrylate group or methacrylate group is preferred. A compound which can be preferably used in the present invention is represented by the following formula (3).

[formula 1]

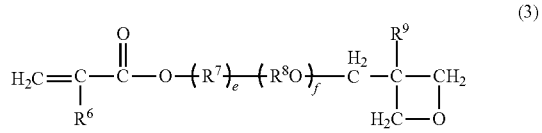

(3)

In the above formula, $R^6$ is a hydrogen atom or methyl group, $R^7$ and $R^8$ are each independently a linear or branched alkylene group having 1 to 4 carbon atoms, $R^9$ is a linear or branched alkyl group having 1 to 4 carbon atoms, and "e" and "f" are each an average value of 0 to 20.

Examples of the compound as the component (A) which can be preferably used in the present invention include (3-ethyl-3-oxetanyl)methyl methacrylate, 2-(3-ethyl-3-oxetanyl)ethyl methacrylate, 3-(3-ethyl-3-oxetanyl)propyl methacrylate, 4-(3-ethyl-3-oxetanyl)butyl methacrylate, 2-[(3-ethyl-3-oxetanyl)methoxy]ethyl methacrylate, 2-[2-[(3-ethyl-3-oxetanyl)methoxy]ethoxy]ethyl methacrylate, 2-[(3-ethyl-3-oxetanyl)methoxy]-2-oxyethyl methacrylate, (3-methyl-3-oxetanyl)methyl methacrylate, 2-(3-methyl-3-oxetanyl)ethyl methacrylate, 3-(3-methyl-3-oxetanyl)propyl methacrylate, 4-(3-methyl-3-oxetanyl)butyl methacrylate, 2-[(3-methyl-3-oxetanyl)methoxy]ethyl methacrylate, 2-[2-[(3-methyl-3-oxetanyl)methoxy]ethoxy]ethyl methacrylate, (3-ethyl-3-oxetanyl)methyl acrylate, 2-(3-ethyl-3-oxetanyl)ethyl acrylate, 3-(3-ethyl-3-oxetanyl)propyl acrylate, 4-(3-ethyl-3-oxetanyl)butyl acrylate, 2-[(3-ethyl-3-oxetanyl)methoxy]ethyl acrylate, 2-[2-[(3-ethyl-3-oxetanyl)methoxy]ethoxy]ethyl acrylate and 2-[(3-ethyl-3-oxetanyl)methoxy]-2-oxyethyl acrylate. Out of these, (3-ethyl-3-oxetanyl)methyl methacrylate, 2-(3-ethyl-3-oxetanyl)ethyl methacrylate, 2-[(3-ethyl-3-oxetanyl)methoxy]ethyl methacrylate, (3-methyl-3-oxetanyl)methyl methacrylate and (3-ethyl-3-oxetanyl)methyl acrylate are preferred, and (3-ethyl-3-oxetanyl)methyl methacrylate is particularly preferred. These components (A) may be used alone or in combination of two or more.

Component (B)

A description is subsequently given of the photochromic compound as the component (B).

As the photochromic compound (component (B)) which exhibits photochromic properties, photochromic compounds known per se may be used. They may be used alone or in combination of two or more.

Typical examples of the photochromic compound include fulgide compounds, chromene compounds and spirooxazine compounds as disclosed in many documents, for example, JP-A 2-28154, JP-A 62-288830, WO94/22850 pamphlet and WO96/14596 pamphlet.

In the present invention, out of the known photochromic compounds, chromene compounds having an indeno[2,1-f]naphtho[1,2-b]pyran skeleton are preferably used from the viewpoints of photochromic properties such as color optical density, initial coloration, durability and fading speed. Chromene compounds having a molecular weight of 540 or more are particularly preferably used as they are particularly excellent in color optical density and fading speed.

Chromene compounds given below are examples of the chromene compound which is particularly preferably used in the present invention.

[formula 2]

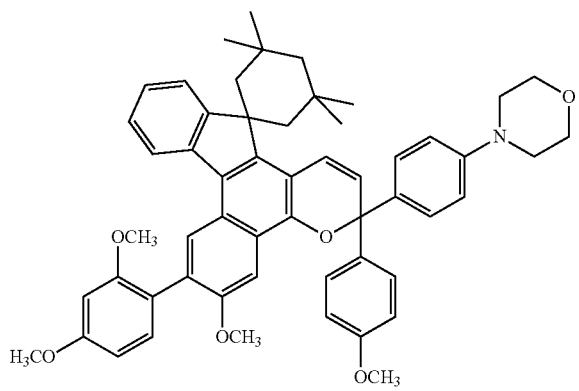

[formula 3]

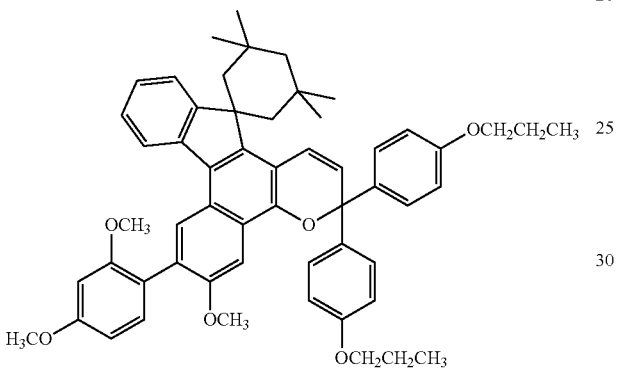

[formula 4]

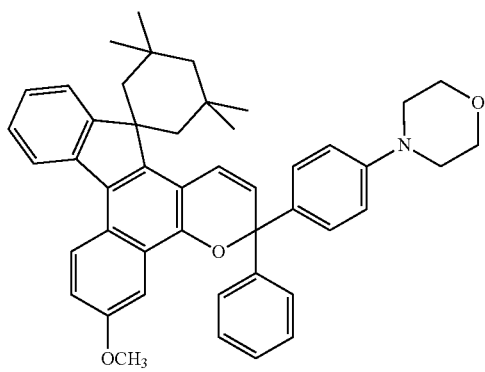

When a compound having an amino group as a substituent out of the above chromene compounds having an indeno[2,1-f]naphtho[1,2-b]pyran skeleton is used, the present invention exhibits a particularly excellent effect. According to studies conducted by the inventors of the present invention, when the chrome compound having an amino group (having two hydrogen atoms, one of them is substituted by another group or two hydrogen atoms are substituted by another group) is used, the obtained photochromic cured body may greatly change its color with the passage of time. Therefore, when this chromene compound having an amino group is used, the present invention is particularly effective. The following compounds are given as examples of the chromene compound.

[formula 5]

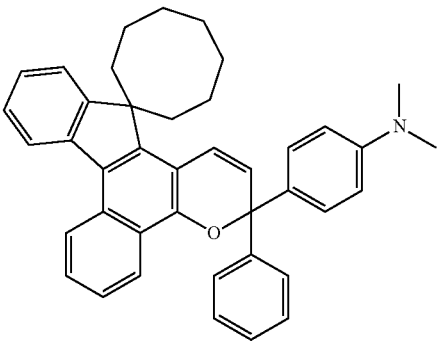

[formula 6]

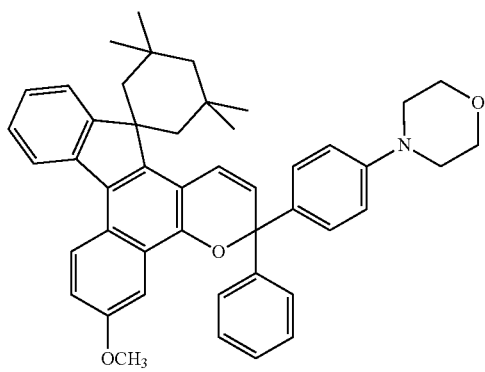

Component (C)

The photochromic curable composition of the present invention comprises polymerizable monomers (component (C)) other than the component (A) in addition to the above component (A).

Known polymerizable monomers may be used as the above component (C). It is preferred that a (meth)acrylate monomer component having at least two (meth)acrylate groups in one molecule should be contained. It is more preferred that a bifunctional (meth)acrylate monomer having two (meth)acrylate groups in one molecule (to be simply referred to as "(C1) bifunctional (meth)acrylate monomer" or "component (C1)" hereinafter) and a multifunctional (meth)acrylate monomer having at least three (meth)acrylate groups in one molecule (to be simply referred to as "(C2) multifunctional (meth)acrylate monomer" or "component (C2)" hereinafter) should be contained. Further, a monofunctional (meth)acrylate having one (meth)acrylate group (to be simply referred to as "(C3) monofunctional (meth)acrylate monomer" or "component (C3)" hereinafter) may be contained. A description is subsequently given of these polymerizable monomers (C).

(C1) Bifunctional (meth)acrylate Monomer;

The photochromic curable composition of the present invention preferably comprises the bifunctional (meth)acrylate monomer (C1). Examples of the monomer (C1) are given below. They are compounds presented by the following formulas (1), (4) and (5). Out of these, a polyalkylene glycol di(meth)acrylate monomer which has a molecular weight of 300 to 2,000 and is a bifunctional (meth)acrylate monomer component represented by the following formula (1) is preferably contained.

The compound represented by the following formula (1) may be simply referred to as "component (C1-1)", the compound represented by the following formula (4) may be simply referred to as "component (C1-2)", and the compound represented by the following formula (5) may be simply referred to as "component (C1-3)" hereinafter.

As the other components (C1), a bifunctional (meth)acrylate monomer having a urethane bond (to be simply referred to as "component (C1-4)" hereinafter) and a bifunctional (meth)acrylate monomer (to be simply referred to as "component (C1-5)" hereinafter) which does not correspond to the above component (C1-1), the above component (C1-2), the above component (C1-3) and the above component (C1-4) will be described below.

(C1-1) Polyalkylene glycol di(meth)acrylate Monomer Represented by the Following Formula (1)

[formula 7]

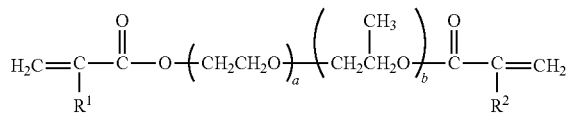

(1)

In the above formula, $R^1$ and $R^2$ are each a hydrogen atom or methyl group, and "a" and "b" are each an integer of 0 or more, and (a+b) is an integer of 2 or more. The component (C-1) is often obtained as a mixture in production. Therefore, (a+b) is an average value of 2 or more, preferably 2 to 30.

Examples of the compound as the component (C-1-1) represented by the above formula (1) include diethylene glycol dimethacrylate, triethylene glycol dimethacrylate, tetraethylene glycol dimethacrylate, pentaethylene glycol dimethacrylate, pentapropylene glycol dimethacrylate, diethylene glycol diacrylate, triethylene glycol diacrylate, tetraethylene glycol diacrylate, pentaethylene glycol diacrylate, tripropylene glycol diacrylate, tetrapropylene glycol diacrylate, pentapropylene glycol diacrylate, di(meth)acrylates consisting of a mixture of polypropylene glycol and polyethylene glycol (polyethylene has two recurring units and polypropylene has two recurring units), polyethylene glycol dimethacrylate (especially an average molecular weight of 330), polyethylene glycol dimethacrylate (especially an average molecular weight of 536), polyethylene glycol dimethacrylate (especially an average molecular weight of 736), tripropylene glycol dimethacrylate, tetrapropylene glycol dimethacrylate, polypropylene glycol dimethacrylate (especially an average molecular weight of 536), polyethylene glycol diacrylate (especially an average molecular weight of 308), polyethylene glycol diacrylate (especially an average molecular weight of 508), polyethylene glycol diacrylate (especially an average molecular weight of 708) and polyethylene glycol methacrylate acrylate (especially an average molecular weight of 536). Further, out of these polyalkylene glycol di(meth)acrylate monomers, polyalkylene glycol di(meth)acrylate monomers having a molecular weight of 300 to 2,000 are preferred from the viewpoint of the viscosity of the composition.

In the present invention, to obtain a photochromic cured body having excellent properties, the above component (C1-1) is preferably contained as an essential component.

(C1-2) Monomer Represented by the Following Formula (4)

[formula 8]

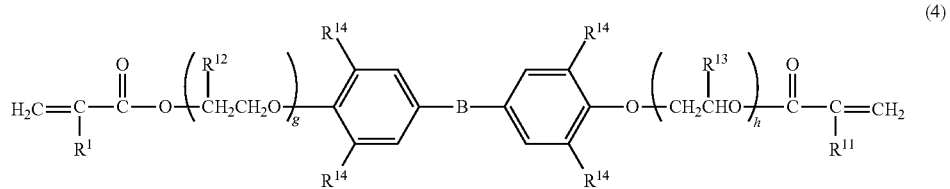

(4)

In the above formula, $R^{10}$ and $R^{11}$ are each a hydrogen atom or methyl group, $R^{12}$ and $R^{13}$ are each a hydrogen atom or methyl group, $R^{14}$'s are each a hydrogen atom or halogen atom, B is any one of —O—, —S—, —(SO$_2$)—, —CO—, —CH$_2$—, —CH=CH—, —C(CH$_3$)$_2$— and —C(CH$_3$)(CH$_6$H$_5$)—, "g" and "h" are each an integer of 1 to 29, and (g+h) is an integer of 2 to 30 as an average value.

The polymerizable monomer represented by the above formula (4) is generally obtained as a mixture of molecules having different molecular weights. Therefore, "g" and "h" are average values.

Examples of the compound represented by the above formula (4) include the following bisphenol A di(meth)acrylates.

2,2-bis[4-methacryloyloxy.ethoxy]phenyl]propane (g+h=2),
2,2-bis[4-ethacryloyloxy.diethoxy]phenyl]propane (g+h=4),
2,2-bis[4-methacryloyloxy.polyethoxy]phenyl]propane (g+h=7),
2,2-bis(3,5-dibromo-4-methacryloyloxyethoxyphenyl)propane (g+h=2),
2,2-bis(4-methacryloyloxydipropoxyphenyl)propane (g+h=4),
2,2-bis[4-acryloyloxy.diethoxy]phenyl]propane (g+h=4),
2,2-bis[4-acryloyloxy.polyethoxy]phenyl]propane (g+h=3),
2,2-bis[4-acryloyloxy.polyethoxy]phenyl]propane (g+h=7),
2,2-bis[4-methacryloyloxy(polyethoxy)phenyl]propane (g+h=10),
2,2-bis[4-methacryloyloxy(polyethoxy)phenyl]propane (g+h=17),
2,2-bis[4-methacryloyloxy(polyethoxy)phenyl]propane (g+h=30),
2,2-bis[4-acryloyloxy(polyethoxy)phenyl]propane (g+h=10),
2,2-bis[4-acryloyloxy(polyethoxy)phenyl]propane (g+h=20)

(C1-3) Monomer Represented by the Following Formula (5)

[formula 9]

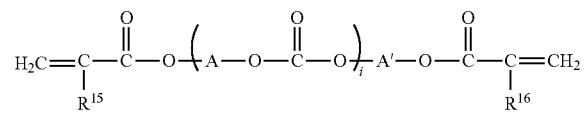

(5)

In the above formula, $R^{15}$ and $R^{16}$ are each a hydrogen atom or methyl group, "i" is an average value of 1 to 20, and "A" and "A'" may be the same or different and each a linear or branched alkylene group having 2 to 15 carbon atoms, with the proviso that when a plurality of A's are existent, A's may be the same or different.

The compound represented by the above formula (5) can be produced by reacting a polycarbonate diol with (meth) acrylic acid.

Examples of the polycarbonate diol used herein are given below. They are polycarbonate diols (having a number average molecular weight of 500 to 2,000) obtained by phosgenating polyalkylene glycols such as trimethylene glycol, tetramethylene glycol, pentamethylene glycol, hexamethylene glycol, octamethylene glycol and nonamethylene glycol; polycarbonate diols (having a number average molecular weight of 500 to 2,000) obtained by phosgenating a mixture of two or more polyalkylene glycols such as a mixture of trimethylene glycol and tetramethylene glycol, a mixture of tetramethylene glycol and hexamethylene diglycol, a mixture of pentamethylene glycol and hexamethylene glycol, a mixture of tetramethylene glycol and octamethylene glycol or a mixture of hexamethylene glycol and octamethylene glycol; and polycarbonate diols (having a number average molecular weight of 500 to 2,000) obtained by phosgenating 1-methyltrimethylene glycol.

In the present invention, the above component (C1-1), the above component (C1-2) and the above component (C1-3) may be separately used according to use purpose. For example, the type and amount may be suitably determined according to the method of producing a photochromic cured body such as kneading method or lamination method. In both of the kneading method and the lamination method, the above component (C1-1) is preferably used.

A description is subsequently given of the other component (C).

(C1-4) Bifunctional (meth)acrylate Monomer Having a Urethane Bond

A typical example of the component (C1-4) is a reaction product of a polyol and a polyisocyanate. Examples of the polyisocyanate include hexamethylene diisocyanate, isophorone diisocyanate, lysine isocyanate, 2,2,4-hexamethylene diisocyanate, dimeric acid diisocyanate, isopropylidenebis-4-cyclhexyl isocyanate, dicyclohexylmethane diisocyanate, norbornene diisocyanate and methylcyclohexane diisocyanate.

Examples of the polyol include polyalkylene glycols having a recurring unit such as ethylene oxide, propylene oxide and hexamethylene oxide having 2 to 4 carbon atoms, polyester diols such as polycaprolactone diols, polycarbonate diols, polybutadiene diols, pentaerythritol, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, 1,4-cyclohexanedimethanol, glycerin and trimethylolpropane.

As the component (C1-4), a urethane (meth)acrylate monomer which is a reaction mixture obtained by reacting 2-hydroxy (meth)acrylate with a urethane prepolymer obtained by a reaction between the above polyisocyanate and the above polyol or a reaction mixture obtained by directly reacting the above diisocyanate with 2-hydroxy (meth)acrylate may also be used.

Commercially available products of the component (C1-4) include the U-2PPA (molecular weight of 482), UA-122P (molecular weight of 1,100) and U-122P (molecular weight of 1,100) of Shin Nakamura Chemical Co., Ltd. and the EB4858 (molecular weight of 454) of Daicel UCB.

(C1-5) Other Bifunctional (meth)acrylate Monomers

As the component (C1-5), a compound having a (meth) acrylate group at both ends of an alkylene group which may have a substituent may be used. The component (C1-5) is preferably a compound having an alkylene group with 6 to 20 carbon atoms. Examples of the compound include 1,6-hexanediol diacrylate, 1,6-hexanediol dimethacrylate, 1,9-nonanediol diacrylate, 1,9-nonanediol dimethacrylate, 1,10-decanediol diacrylate and 1,10-decanediol dimethacrylate.

As the other component (C-5), a bifunctional (meth) acrylate monomer containing a sulfur atom may be used. In this case, the sulfur atom preferably forms part of the molecular chain of a sulfide group. Examples of the component (C1-5) include bis(2-methacryloyloxyethylthioethyl) sulfide, bis(methacryloyloxyethyl)sulfide, bis(acryloyloxyethyl)sulfide, 1,2-bis(methacryloyloxyethylthio)ethane, 1,2-bis(acryloyloxyethyl)ethane, bis(2-methacryloyloxyethylthioethyl)sulfide, bis(2-acryloyloxyethylthioethyl)sulfide, 1,2-bis(methacryloyloxyethylthioethylthio)ethane, 1,2-bis(acryloyloxyethylthioethylthio)ethane, 1,2-bis(methacryloyloxyisopropylthioisopropyl)sulfide and 1,2-bis(acryloyloxyisopropylthioisopropyl)sulfide.

Compounds listed for the above components (C1-1), (C1-2), (C1-3), (C1-4) and (C1-5) may be used alone or in combination. When they are used in combination, the amount of the component (C1) is the total amount of these.

A description is subsequently given of the polyfunctional (meth)acrylate monomer (C2).

(C2) Polyfunctional (meth)acrylate Monomer

As the component (C2), a compound represented by the following formula (2) (may be simply referred to as "component (C2-1)" hereinafter), a polyfunctional (meth)acrylate monomer having a urethane bond (may be simply referred to as "component (C2-2) hereinafter), a polyrotaxane monomer (may be simply referred to as "component (C2-3)" hereinafter), a silsesquioxane monomer (may be simply referred to as "component (C2-4)" hereinafter), and a polyfunctional (meth)acrylate monomer other than the above component (C2-1) and the above component (C2-2) (may be simply referred to as "component (C2-5)" hereinafter) may be used. Out of these, the above component (C2-1) is preferably contained as an essential component as the characteristic properties of the obtained photochromic cured body can be easily controlled.

(C2-1) Polyfunctional (meth)acrylate Monomer Represented by the Following Formula (2)

As the polyfunctional (meth)acrylate monomer, a compound represented by the following formula (2) is used.

[formula 10]

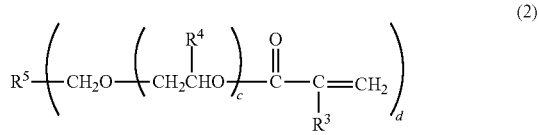

(2)

In the above formula, $R^3$ is a hydrogen atom or methyl group, $R^4$ is a hydrogen atom or alkyl group having 1 to 2 carbon atoms, $R^5$ is a carbon atom, trivalent to hexavalent hydrocarbon group having 1 to 10 carbon atoms or organic group containing an oxygen atom and having 3 to 6 carbon atoms, "c" is an average value of 0 to 3, and "d" is an integer of 3 to 6.

The alkyl group having 1 to 2 carbon atoms represented by $R^4$ is preferably a methyl group. Examples of the organic group represented by $R^5$ include carbon atom, hydrocarbon group containing a hydroxyl group derived from a polyol, trivalent to hexavalent hydrocarbon group and trivalent to hexavalent organic group containing a urethane bond.

Examples of the compound represented by the above formula (2) are given below. Trimethlolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate and ditrimethylolpropane tetraacrylate.

(C2-2) Polyfunctional (meth)acrylate Monomer Having a Urethane Bond

The component (C2-2) is obtained by reacting a polyisocyanate compound described for the component (C1-4) with a polyol compound and has at least three (meth)acrylate groups in the molecule. Commercially available products of the component (C2-2) include U-4HA (molecular weight of 596, 4 functional groups), U-6HA (molecular weight of 1,019, 6 functional groups), U-6LPA (molecular weight of 818, 6 functional groups) and U-15HA (molecular weight of 2,300, 15 functional groups) of Shin Nakamura Chemical Co., Ltd.

(C2-3) Polyrotaxane Monomer

The polyrotaxane monomer is a monomer having a composite molecular structure composed of cyclic molecules and an axial molecule which passes through the inside of each of the rings of the cyclic molecules and has a bulky group at both ends to prevent the rings from being detached and at least three (meth)acrylate groups in the molecule.

In the polyrotaxane monomer, the polymer forming the chain part is preferably polyethylene glycol, polyisoprene, polyisobutylene, polybutadiene, polypropylene glycol, polytetrahydrofuran, polydimethylsiloxane, polyethylene, polypropylene, polyvinyl alcohol or polyvinyl methyl ether out of which polyethylene glycol is most preferred.

Further, the bulky group formed at both ends of the chain part is preferably an adamantyl group.

The molecular weight of the above axial molecule is not particularly limited. However, when it is too high, its compatibility with other components, for example, other polymerizable monomers tends to become low and when it is too low, the mobility of the cyclic molecules lowers, whereby photochromic properties tend to deteriorate. From this point of view, the weight average molecular weight Mw of the axial molecule is preferably 1,000 to 100,000, more preferably 5,000 to 80,000, particularly preferably 8,000 to 30,000.

The cyclic molecule should have a ring large enough to clathrate the above axial molecule, and this ring is preferably a cyclodextrin ring.

The cyclodextrin ring has an α-form (ring inner diameter of 0.45 to 0.6 nm), β-form (ring inner diameter of 0.6 to 0.8 nm) and γ-form (ring inner diameter of 0.8 to 0.95 nm). An α-cyclodextrin ring and γ-cyclodextrin ring are preferred, and an α-cyclodextrin ring is most preferred in the present invention.

A plurality of the cyclic molecules having the above ring clathrate one axial molecule. In general, when the maximum number of cyclic molecules capable of clathrating one axial molecule is 1, the number of clathrating cyclic molecules is preferably 0.001 to 0.6, more preferably 0.002 to 0.5, much more preferably 0.003 to 0.4.

The polyrotaxane monomer (C2-3) used in the present invention is a polyrotaxane compound in which a side chain having an OH group (hydroxyl group) has been introduced into the above-described cyclic molecules.

Although the above side chain is not particularly limited, it is preferably formed by the repetitions of organic chains having an OH group and 3 to 20 carbon atoms. The average molecular weight of this side chain is preferably 300 to 10,000, more preferably 350 to 8,000, much more preferably 350 to 5,000, most preferably 400 to 1,500.

The above side chain is introduced by using the functional group of the cyclic molecule and modifying the functional group. For example, since the α-cyclodextrin ring has 18 OH groups (hydroxyl groups) as functional groups, the side chain is introduced through the OH group. That is, a maximum of 18 side chains can be introduced into one α-cyclodextrin ring. In the present invention, to fully develop the function of the above side chain, 6% or more, particularly 30% or more of all the functional groups of the ring are preferably modified by the side chain.

In the present invention, the above side chain (organic chains) may be linear or branched if the organic chain has an OH group.

For example, a side chain derived from a cyclic compound such as lactone or cyclic ether may be introduced by ring-opening polymerization. An OH group is introduced into the ends of the side chain which has been introduced by the ring-opening polymerization of a cyclic compound such as lactone or cyclic ether.

In the present invention, the compound which is preferably used to introduce the side chain is a lactone compound. Examples of the lactone compound include ε-caprolactone, α-acetyl-γ-butyrolactone, α-methyl-γ-butyrolactone, γ-valerolactone and γ-butyrolactone out of which ε-caprolactone is most preferred.

To introduce the side chain by reacting a cyclic compound by ring-opening polymerization, the functional groups (for example, hydroxyl groups) bonded to the ring have poor reactivity and therefore, it may be difficult to directly react a large molecule due to steric hindrance. In this case, to react, for example, caprolactone, means of introducing the side chain by reacting a low-molecular weight compound such as propylene oxide with a functional group to carry out hydroxypropylation and then ring-opening polymerizing the above cyclic compound with a functional group (hydroxyl group) having high reactivity may be employed in advance. In this case, it is needless to say that the hydroxypropylated part is part of the side chain.

In the polyrotaxane monomer (C2-3) used in the present invention, it is preferred that a (meth)acrylate group should be introduced into the side chain of the polyrotaxane compound by reacting the OH group of the side chain in the polyrotaxane compound with a compound having a (meth) acrylate group. In the present invention, this reaction is called as "modification".

The compound having a polymerizable group is introduced by using the above-described side chain and a compound which reacts with the OH group of the side chain may be used. The compound having a (meth)acrylate group itself is preferably a compound having no OH group in the molecule when compatibility with other components is taken into consideration.

When the yield, mechanical strength and photochromic properties of the obtained cured body are taken into consideration, the modification rate by the above compound having a polymerizable group may be ensured that at least three (meth)acrylate groups should be existent in one molecule, and the hydroxyl groups of the other side chain and the cyclic molecule may be hydroxyl groups as they are or may be modified by a group other than polymerizable groups. In the case of the polyrotaxane monomer, preferably 3 to 1,000 (meth)acrylate groups, more preferably 50 to 500 (meth)acrylate groups are contained in one molecule due to its unique mobility.

(C2-4) Silsesquioxane Monomer

The component (C2-4) is a silsesquioxane monomer represented by the following formula (6).

[formula 11]

$$R^{17}\text{—}SiO_{2/3})_j \qquad (6)$$

(In the above formula, a plurality of $R^{17}$'s may be the same or different and each a hydrogen atom or organic group, "j" is an integer of 15 to 50 indicative of the degree of polymerization, and at least 10 $R^{17}$'s are organic groups containing a (meth)acrylate group.

The weight average molecular weight of the component (C2-4) is preferably 3,000 to 8,000, and the (meth)acrylate equivalent is preferably 150 to 800. The average molecular weight of the component (C2-4) is a value measured by gel permeation chromatography (GPC).

The organic group containing a (meth)acrylate group represented by $R^{17}$ includes (meth)acrylate group alone (including, for example, a polymerizable group (such as (meth)acrylate) bonded directly to a silicon atom). Specific examples of the organic group include (meth)acrylate group, (meth)acryloxypropyl group and (3-(meth)acryloxypropyl) dimethylsiloxy group. The (meth)acryloxypropyl group is particularly preferred as the acquisition of raw materials at the time of producing the component (C2-4) is easy and high film strength can be obtained while excellent photochromic properties are developed.

When $R^{17}$ in the above formula (6) is not an organic group containing a (meth)acrylate group, it is preferably a hydrogen atom, alkyl group, cycloalkyl group, alkoxy group or phenyl group.

The component (C2-4) needs to be prepared such that at least 10 (meth)acrylate groups on average are existent in one molecule. Preferably 10 to 100 (meth)acrylate groups, more preferably 15 to 35 (meth)acrylate groups are contained in one molecule. "j" is an integer of 15 to 50 indicative of the degree of polymerization.

Although the silsesquioxane compound may take a cage-like, ladder-like or random structure, the component (C2-4) used in the present invention is preferably a mixture having a plurality of structures. One monomer may be used or a mixture of a plurality of monomers may also be used as the component (C2-4). In the case of a mixture, the total mass of the mixture is considered as the amount of the component (C2-4).

(C2-5) Polyfunctional (meth)acrylate Monomer

The component (C2-5) is preferably a compound obtained by modifying the end of a polyester compound with a (meth)acrylate group. Commercially available polyester (meth)acrylate compounds which differ in the molecular weight of a polyester compound as a raw material and the modification amount of a (meth)acrylate group may be used. Examples of the component (C2-5) include tetrafunctional polyester oligomers (molecular weight of 2,500 to 3,500, for example, EB80 of Daicel UCB), hexafunctional polyester oligomers (molecular weight of 6,000 to 8,000, for example, EB450 of Daicel UCB), hexafunctional polyester oligomers (molecular weight of 45,000 to 55,000, for example, EB1830 of Daicel UCB), and tetrafunctional polyester oligomers (especially GX8488B having a molecular weight of 10,000 of DAI-ICHI KOGYO SEIYAKU Co., Ltd.).

By using the above component (C2) (component (C2-1), component (C2-2), component (C2-3), component (C2-4) and component (C2-5)) listed above, crosslinking density is improved by polymerization, thereby making it possible to enhance the surface hardness of the obtained cured body. Therefore, to obtain a photochromic cured body (laminate) by the coating method, the component (C2) is preferably contained. Out of these, the component (C2-1) is particularly preferably used.

Compounds listed for the above component (C2-1), component (C2-2), component (C2-3), component (C2-4) and component (C2-5) may be used alone or in combination. When a plurality of compounds are used, the amount of the component (C2) is the total amount of these. A description is subsequently given of the monofunctional (meth)acrylate monomer (C3).

(C3) Monofunctional (meth)acrylate Monomer

As the component (C3), a compound represented by the following formula (7) is used.

[formula 12]

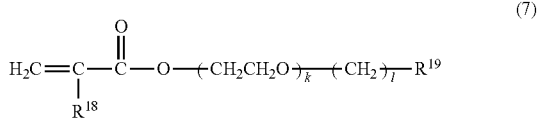

$$H_2C\!=\!\underset{R^{18}}{C}\!-\!\overset{O}{\underset{\|}{C}}\!-\!O\!-\!(CH_2CH_2O)_{\overline{k}}\!-\!(CH_2)_{\overline{l}}\!-\!R^{19} \qquad (7)$$

In the above formula, $R^{18}$ is a hydrogen atom or methyl group, $R^{19}$ is a hydrogen atom, methyl dimethoxysilyl group or trimethoxysilyl group, "k" is an integer of 0 to 10, and "l" is an integer of 0 to 20.

Examples of the compound represented by the above formula (7) include methoxy polyethylene glycol methacrylate (especially an average molecular weight of 293), methoxy polyethylene glycol methacrylate (especially an average molecular weight of 468), methoxy polyethylene glycol acrylate (especially an average molecular weight of 218), methoxy polyethylene glycol acrylate (especially an average molecular weight of 454), stearyl methacrylate, lauryl methacrylate, methyl acrylate, ethyl acrylate, butyl acrylate, octyl acrylate, lauryl acrylate, γ-methacryloyloxypropyl trimethoxysilane and γ-methacryloyloxypropylmethyl dimethoxysilane.

Content of Each Component in Component (C)

The polymerizable monomers (C) preferably include the above component (C1), the above component (C2) and optionally the above component (C3) When the hardness, mechanical properties and photochromic properties such color optical density and fading speed of the obtained photochromic cured body are taken into consideration, preferably, the amount of the above component (C1) is 30 to 90 parts by mass, the amount of the above component (C2) is 5 to 50 parts by mass, and the amount of the above component (C3) is 0 to 20 parts by mass based on 100 parts by mass of the total of the component (C).

(Preferred Composition of Photochromic Curable Composition)

In the photochromic curable composition of the present invention, when the hardness, mechanical properties and photochromic properties such color optical density and fading speed of the obtained photochromic cured body are taken into consideration, preferably, the amount of the component (A) is 0.1 to 5 parts by mass and the amount of the above component (B) is 0.001 to 10 parts by mass based on 100 parts by mass of the total of the component (C). To develop excellent photochromic properties, the amount of the component (B) is more preferably 1 to 400 parts by mass based on 100 parts by mass of the component (A).

(Photochromic Curable Composition; Other Additives)

The photochromic curable composition of the present invention comprises the above component (A), component (B) and component (C) as essential components. The photochromic curable composition may be blended with known additives. For example, stabilizers, additives and polymerization modifiers such as surfactant, release agent, ultraviolet absorbent, infrared absorbent, ultraviolet stabilizer, antioxidant, coloring inhibitor, antistatic agent, fluorescent dye, dye, pigment and fragrance may be mixed as required.

When an ultraviolet stabilizer out of these is mixed, the durability of the photochromic compound can be further improved advantageously. As the ultraviolet stabilizer, hindered amine optical stabilizers, hindered phenol antioxidants and sulfur-based antioxidants may be preferably used. Although the hindered amine optical stabilizers are not particularly limited, bis(1,2,2,6,6-pentamethyl-4-piperidyl) sebacate is preferred from the viewpoint of the prevention of the deterioration of the photochromic compound. Commercially available hindered amine-based stabilizers which are marketed under the trade names of ADK STAB LA-52, LA-57, LA-62, LA-63, LA-67, LA-77, LA-82 and LA-87 by ADEKA Corporation may be preferably used.

Hindered phenol antioxidants are preferred as they prevent the deterioration of the photochromic compound. Examples of the hindered phenol antioxidants include 2,6-di-t-butyl-4-methyl-phenol, IRGANOX245 (registered trademark) of BASF Japan: ethylenebis(oxyethylene)bis[3,5-tert-butyl-4-hydroxy-m-toluyl]propionate], IRGANOX1076 (registered trademark) of BASF Japan: octadecyl-3-(3,5-di-tert-butyl-4-hydroxyphenyl)propionate, IRGANOX1010 (registered trademark of BASF Japan: pentaerythritol tetrakis[3-(3,5-di-tert-butyl-4-hydroxyphenyl) propionate] and the IRGANOX1035, 1075, 1098, 1135, 1141, 1222, 1330, 1425, 1520, 259, 3114, 3790, 5057 and 565 (registered trademarks) of BASF Japan.

The amount of the ultraviolet stabilizer is preferably 0.01 to 20 parts by mass, more preferably 0.1 to 10 parts by mass based on 100 parts by mass of the total of the components (A) and (C).

As the polymerization modifier, a thiol such as t-dodecyl mercaptan may be added.

Besides (meth)acrylate monomers, a polymerizable monomer such as a vinyl monomer may be added. As the vinyl monomer, known compounds may be used without restriction but a compound which functions as a polymerization modifier is preferably blended to improve the moldability of the photochromic curable composition. Examples of the vinyl monomer include α-methylstyrene and α-methylstyrene dimer. A combination of α-methylstyrene and α-methylstyrene dimer is particularly preferred.

As the surfactant, known surfactants such as silicone surfactants having a silicone chain (polyalkylsiloxane unit) as a hydrophobic group and fluorine surfactants having a fluorocarbon chain are used. When the photochromic coating layer of the present invention is to be formed by the coating method, wettability to an optical substrate or a primer formed on an optical substrate to improve adhesion can be improved and the occurrence of an appearance defect can be prevented by adding a surfactant without adversely affecting adhesion and photochromic properties.

Examples of the silicone surfactants and fluorine surfactants which can be preferably used in the present invention include the L-7001, L-7002, L-7604 and FZ-2123 of Dow Corning Toray Co., Ltd., the MEGAFAC F-470, MEGAFAC F-1405 and MEGAFAC F-479 of DIC Corporation, and the FLORAD FC-430 of Sumitomo 3M Limited. A mixture of two or more surfactants may be used.

<Polymerization Initiator, Method of Producing a Photochromic Cured Body>

To obtain the cured body from the photochromic curable composition, a known radical polymerization method may be employed. Stated more specifically, it can be carried out by using a radical polymerization initiator such as a peroxide or azo compound, irradiating ultraviolet light (UV light), α-ray, β-ray or γ-ray, or using both of them. A typical example of the polymerization method is cast polymerization in which the photochromic curable composition of the present invention comprising a radical polymerization initiator is injected between molds held by an elastomer gasket or spacer and polymerized in an air furnace and a cured body is taken out.

To obtain a laminate, a known method may be employed. Stated more specifically, a layer made of the photochromic curable composition is formed on a plastic substrate, polymerized and cured. To polymerize the photochromic curable composition, heat, the irradiation of ultraviolet light (UV light), α-ray, β-ray or γ-ray, or both of them are used. At this point, it is preferred that a radical polymerization initiator such as a thermopolymerization initiator or photopolymerization initiator listed below should be blended into the photochromic curable composition of the present invention. To obtain the cured body from the photochromic composition of the present invention by coating, photopolymerization is preferably employed as uniform film thickness is easily obtained.

When the polymerization initiator is used in the present invention, the amount of the polymerization initiator is preferably 0.001 to 10 parts by mass, more preferably 0.01 to 5 parts by mass based on 100 parts by mass of the total of the component (A) and the component (C).

As for typical examples of the polymerization initiator, thermopolymerization initiators include diacyl peroxides such as benzoyl peroxide, p-chlorobenzoyl peroxide, decanoyl peroxide, lauroyl peroxide and acetyl peroxide; peroxy esters such as t-butylperoxy-2-ethyl hexanoate, t-butyl peroxyneodecanoate, cumyl peroxyneodecanoate and t-butyl peroxybenzoate; percarbonates such as diisopropyl peroxydicarbonate and di-sec-butyl peroxydicarbonate; and azo compounds such as azobisisobutyronitrile.

To thermally polymerize the photochromic curable composition of the present invention, temperature out of polymerization conditions affects the properties of the obtained photochromic cured body and laminate. Although this temperature condition is not particularly limited as it is affected by the type and amount of the thermopolymerization initiator and the types of the monomers, in general, so called "tapered polymerization" is preferred that polymerization is started at a relatively low temperature, the temperature is then gradually raised, and the photochromic curable composition is cured at a high temperature at the end of polymerization. Since the polymerization time differs by various factors like the temperature, it is preferred to determine the optimum time according to these conditions in advance. It is preferred to choose conditions which ensure that polymerization is completed in 2 to 24 hours.

As the photopolymerization initiator of the present invention, acetophenone-based and acylphosphine-based compounds may be used. Examples of the photopolymerization initiator include benzophenone; acetophenone-based compounds such as 2,2-dimethoxy-1,2-diphenylethan-1-one, 1-hydroxycyclohexylphenyl ketone, 2-hydroxy-2-methyl-1-phenylpropan-1-one, 1-[4-(2-hydroxyethoxy)-phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)-butanon-1 and 1-(4-isopropylphenyl)-2-hydroxy-2-methylpropan-1-one; α-dicarbonyl-based compounds such as 1,2-diphenylethane dione and methyl phenyl glyoxylate; acylphosphine oxide-based compounds such as 2,6-dimethylbenzoyldiphenylphosphine oxide, bis(2,4,6-trimethylbenzoyl)-phenylphosphine oxide, bis(2,6-dimethoxybenzoyl)-2,4,4-trimethyl-pentylphosphine oxide, 2,4,6-trimethylbenzoyldiphenylphosphine oxide, 2,4,6-trimethylbenzoyldiphenylphosphinic acid methyl ester, 2,6-dichlorobenzoyldiphenylphosphine oxide and 2,6-dimethoxybenzoyldiphenylphosphine oxide; and 1,2-octanedione-1-[4-(phenylthio)-2-(0-benzoyloxime)]. These polymerization initiators may be used alone or in combination of two or more.

To optically polymerize the photochromic curable composition of the present invention, UV intensity out of polymerization conditions affects the properties of the obtained photochromic cured body and laminate. Although the illuminance conditions cannot be limited unconditionally as they are affected by the type and amount of the photopolymerization initiator and the types of the monomers, it is preferred to choose conditions which ensure that UV light having an intensity of 50 to 500 mW/cm$^2$ at a wavelength of 365 nm is irradiated for 0.5 to 5 minutes.

A thermopolymerization initiator and a photopolymerization initiator may be used in combination. When a photopolymerization initiator is used, a known polymerization accelerator such as a tertiary amine may be used in combination.

To form a photochromic layer on the surface of an optical substrate by the lamination method, the optical substrate is not particularly limited and a known substrate may be used. A layer which is a cured body of the photochromic curable composition is formed on this optical substrate. The above cured body layer of the photochromic laminate is included in the photochromic cured body of the present invention.

Examples of the optical substrate include (meth)acrylic resin, polycarbonate resin, allyl resin, thiourethane resin, urethane resin, thioepoxy resin and glass. In the present invention, all of the above optical substrates may be used. A lens substrate obtained by laminating a hard coat layer on this optical substrate may also be used.

When the optical substrate is subjected to a chemical treatment with an alkaline solution or acid solution, or physical treatment such as corona discharge, plasma discharge or polishing to improve the adhesion of the obtained photochromic laminate, adhesion between the photochromic layer and the optical substrate can be enhanced. Before a coating layer is formed by applying the photochromic curable resin to the surface of the optical substrate, a polyurethane-based, polyester-based, polyvinyl acetal-based or epoxy-based primer may be coated and cured.

When the photochromic laminate is to be produced by the coating method, the photochromic curable composition of the present invention which comprises a photopolymerization initiator is applied to the optical substrate by spin coating, placed in an inert gas such as nitrogen and then irradiated with UV, thereby making it possible to obtain the photochromic laminate by the coating method. To enhance adhesion between the photochromic coat layer and the plastic substrate, the laminate is preferably heated at a temperature of 80 to 120° C. for 0.5 to 5 hours. Thereby, a photochromic laminate consisting of a plastic lens substrate, a primer coat layer formed as required and a photochromic coat layer in this order can be obtained. The thickness of the photochromic coat layer formed by the coating method is not particularly limited but preferably 10 to 70 μm.

<Secondary Processing of Photochromic Cured Body; Lamination of Another Layer (Hard Coat Layer)>

Although the photochromic cured body and photochromic laminate obtained as described above may be used as photochromic optical materials directly, they are generally further coated with a hard coat layer before use. Thereby, the scratch resistance of the photochromic optical material can be improved.

As a coating agent (hard coat agent) for forming the hard coat layer, known coating agents may be used without restriction. A hard coat agent comprising a silane coupling agent or sol of silicon, zirconium, antimony, aluminum or titanium oxide as the main component or a hard coat agent comprising an organic polymer as the main component may be used. The coating of the hard coat agent on the coated photochromic optical material is preferably carried out by the same operation as the coating of the optical substrate with the photochromic curable composition. After the pre-treatment of the photochromic optical material, that is, a pre-treatment for impregnating the photochromic optical material with an alkali solution such as sodium hydroxide aqueous solution or potassium hydroxide aqueous solution or a pre-treatment for ultrasonically cleaning the photochromic optical material while it is impregnated with an alkali solution, the hard coat agent may be applied to the surface of the optical material by the above known method. A hard coat layer can be formed by curing the coated hard coat agent by a known method, for example, heating.

<Layer Other than Hard Coat Layer>

Further, processing and secondary treatment such as anti-reflection or antistatic treatment may be made on the photochromic cured body obtained by the above method or the optical article having a hard coat layer on the cured body by forming a thin layer of a metal oxide such as $SiO_2$, $TiO_2$ or $ZrO_2$ by a vapor deposition method or by applying a thin layer of an organic polymer.

EXAMPLES

The following examples are provided for the purpose of further illustrating the present invention but are in no way to be taken as limiting. Evaluations methods used in Examples are as follows.

(Photochromic Properties)

The photochromic cured body/laminate are illuminated by the L-2480 (300 W) SHL-100 xenon lamp of Hamamatsu Photonics K.K. through an aeromass filter (manufactured by Corning Co., Ltd.) at 20° C.±1° C. with a beam intensity on the surface of the polymer of 2.4 mW/cm² at 365 nm and 24 µW/cm² at 245 nm for 300 seconds to develop color and measure the photochromic properties of the above cured body. Photochromic properties are evaluated by the following methods, and the obtained results are shown in respective tables.

Maximum Absorption Wavelength ($\lambda_{max}$):

Maximum absorption wavelength after color development obtained by the spectrophotometer (MCPD1000 instantaneous multi-channel photodetector) of Otsuka Electronics Co., Ltd. The maximum absorption wavelength is connected with color at the time of color development.

Color Optical Density {ε(300)−ε(0)}:

A difference between absorbance {ε(300)} after 300 seconds of exposure at the above maximum absorption wavelength and absorbance ε(0) before exposure. It can be said that as this value becomes larger, photochromic properties become more excellent.

Fading Speed [t½ (sec.)]:

Time required for the reduction of absorbance at the above maximum absorption wavelength of a specimen to ½ of {ε(300)−ε(0)} when exposure is stopped after 300 seconds of exposure. It can be said that as this time becomes shorter, photochromic properties become more excellent.

(Boiling Adhesion Test)

An optical article (hard coat lens) is put into boiled distilled water to evaluate the adhesion of the hard coat lens every hour. Adhesion between the hard coat film and the lens is evaluated before the test and every hour during the test by a cross-cut tape test in accordance with JIS D-0202. That is, a cutter knife is used to make cuts in the surface of the hard coat film at intervals of about 1 mm to form 100 squares. A cellophane adhesive tape (Cellotape (registered trademark) of NICHIBAN Co., Ltd.) is firmly affixed to the hard coat film and then pulled off from the surface at a stroke in a 90° direction to count the number of remaining squares of the hard coat film. The evaluation results show as (number of remaining squares/100) in the Tables.

(Lens Storage Stability Red Coloration Δa* at the Time of Color Development)

As a storage stability promotion test, the photochromic cured body/laminate are kept at 60° C. and 98% in a thermohygrostat bath for 1 week to measure a change in color at the time of color development. As for the measurement method, the above ε(300) spectrum is converted into L*a*b* color system to obtain a change Δ in a* indicative of redness from the following equation based on JIS (JISZ8729).

$$\Delta a^* = a^*(\text{after 1 week}) - a^*(\text{initial})$$

As the rising degree of Δa* becomes higher, the photochromic cured body/laminate become more reddish. It is considered that this test corresponds to one year of actual storage.

(Durability Residual Rate)

As a test for promoting the durability of color development by exposure, accelerated deterioration is carried out for 96 hours by means of the X25 xenon weather meter of Suga Test Instruments Co., Ltd. Thereafter, the above color optical density is evaluated before and after the test to obtain the residual rate from color optical density ($A_0$) before the test and color optical density ($A_{96}$) after the test based on the following equation.

$$\text{Residual rate (\%)} = (A_{96}/A_0) \times 100$$

Abbreviations and names of the compounds used in Examples are given below.

Component (A): Radically Polymerizable Monomer Having at Least One Oxetanyl Group in One Molecule OXE-30: (3-ethyl-3-oxetanyl)methyl methacrylate Component (B): Photochromic Compound

[formula 13]

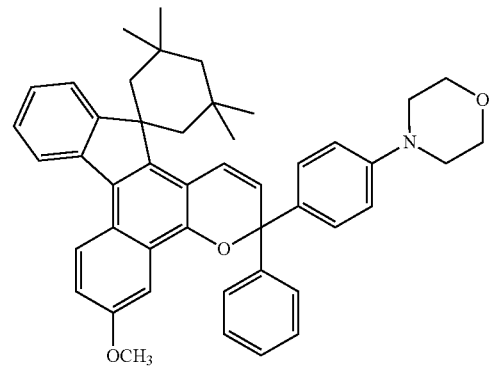

PC1

[formula 14]

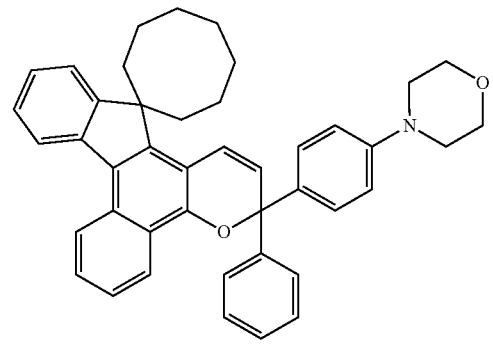

PC2

-continued

[formula 15]

PC3

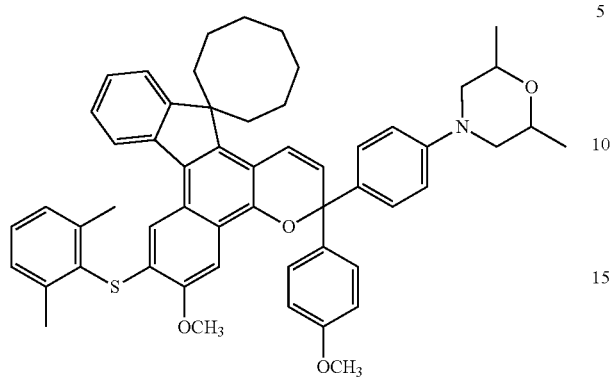

[formula 16]

PC4

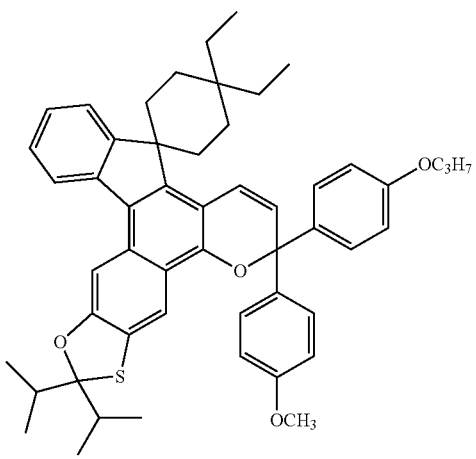

[formula 17]

PC5

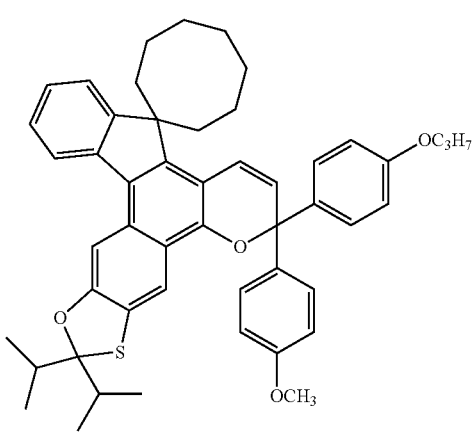

-continued

[formula 18]

PC6

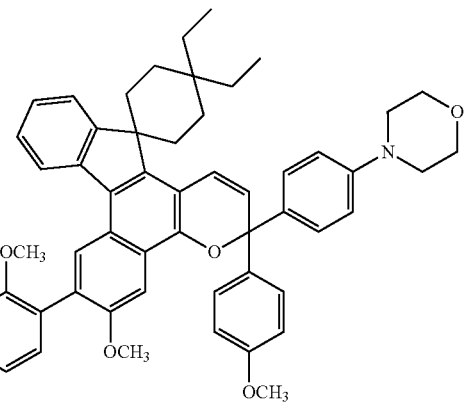

[formula 19]

PC7

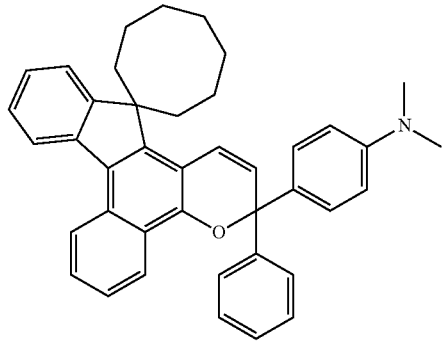

(C) Radically Polymerizable Monomers Component (C1-1)

A-200: tetraethylene glycol diacrylate
A-400: polyethylene glycol diacrylate (average chain length of ethylene glycol chain of 9, average molecular weight of 536)
4G: tetraethylene glycol dimethacrylate
14G: polyethylene glycol dimethacrylate (average chain length of ethylene glycol chain of 14, average molecular weight of 736)

Component (C1-2)

BPE100: 2,2-bis[4-(methacryloxyethoxy)phenyl]propane (average chain length of ethylene glycol chain of 2.6, average molecular weight of 478)
A-BPE-10: ethoxylated bisphenol A diacrylate (average chain length of ethylene glycol chain of 10, average molecular weight of 776)
KT50: ethoxylated bisphenol A dimethacrylate (average chain length of ethylene glycol chain of 10, average molecular weight of 804)
A-PC: ester compound of acrylic acid and polycarbonate diol (average molecular weight of 500) obtained by phosgenating pentamethylene glycol and hexamethylene glycol Component (C2-1)

TMPT: trimethylolpropane trimethacrylate

Component (C2-3)

T15: polyrotaxane monomer This production method is as described in <preparation of polyrotaxane monomer> below. 220 acrylate groups on average are existent in one molecule.

Component (C2-4)
S21: silsesquioxane monomer This production method is as described below.
<Synthesis of S21>
196 ml of ethanol and 54 g (3.0 mol) of water were added to 248 g (1.0 ml) of 3-trimethoxysilylpropyl methacrylate and then 0.20 g (0.005 mol) of sodium hydroxide as a catalyst was further added to the resulting solution to carry out a reaction at 45° C. for 3 hours. After the dissipation of the raw materials was confirmed, the reaction product was neutralized with diluted hydrochloric acid, and 174 ml of toluene, 174 ml of heptane and 174 g of water were added to remove a water layer. Thereafter, an organic layer was washed with water until the water layer became neutral, and the solvent was concentrated to obtain a silsesquioxane monomer (S21). It was confirmed by 1H-NMR that the raw materials were completely consumed. It was also confirmed by $^{29}$Si-NMR that the obtained product was a mixture of cage-like, ladder-like and random structures. When the molecular weight of the silsesquioxane monomer (PMS1) was measured by gel permeation chromatography (GPC), the weight average molecular weight was 3,800. The methacrylic equivalent was about 178 (178 methacrylic groups on average were existent in one molecule).

Component (C3)
GMA: glycidyl methacrylate (comparative component. Since this component has one methacrylic group in the molecule, it is described as the component (C3).)
TSL8370: γ-methacryloyloxypropyl trimethoxysilane
(other monomer components)
αMS: α-methylstyrene
MSD: α-methylstyrene dimer
(Additives)
(Stabilizer)
HALS: bis(1,2,2,6,6-pentamethyl-4-piperidyl)sebacate
HP: ethylenebis(oxyethylene)bis[3-(5-tert-butyl-4-hydroxy-m-tolyl)propionate]
(Initiator)
ND: t-butyl peroxyneodenoate
PI: phenylbis(2,4,6-trimethylbenzoyl)-phosphine oxide
(leveling agent)
L7001: polyether-modified silicone (manufactured by Dow Corning Toray Co., Ltd.)
<Preparation of Polyrotaxane Monomer> Production of Component (C2-3) (Production of (T15))
The polyrotaxane monomer T15 was prepared by the following method.
(Polyrotaxane Monomer Having a Polymerizable Functional Group Introduced Side Chain (T15))
Production Example
(1) Preparation of PEG-COOH;
A linear polyethylene glycol (PEG) having a molecular weight of 11,000 was prepared as a polymer for forming an axial molecule.
Formulation;
10 g of PEG, 100 mg of TEMPO (2,2,6,6-tetramethyl-1-piperidinyloxy radical) and 1 g of sodium bromide were prepared and dissolved in 100 ml of water. 5 mL of a commercially available sodium hypochlorite aqueous solution (effective chlorine concentration of 5%) was added to the resulting solution and stirred at room temperature for 10 minutes. Thereafter, ethanol was added in a maximum amount of 50 ml to terminate the reaction. After extraction was carried out by using 50 mL of methylene chloride, methylene chloride was distilled off and the obtained product was dissolved in 250 mL of ethanol and then reprecipitated at −4° C. over 12 hours to collect PEG-COOH which was then dried.

(2) Preparation of Polyrotaxane;
3 g of PEG-COOH prepared above and 12 g of α-cyclodextrin (α-CD) were each dissolved in 50 ml of 70° C. hot water, and the obtained solutions were fully mixed together by shaking. Then, the reprecipitation of this mixed solution was carried out at 4° C. for 12 hours, and the precipitated clathrate complex was freeze dried to be collected. After 0.13 g of adamantane amine was dissolved in 50 ml of dimethyl formamide (DMF) at room temperature, the above clathrate complex was added to and quickly mixed with the resulting solution by shaking. Then, a solution prepared by dissolving 0.38 g of a BOP reagent (benzotriazol-1-yl-oxy-tris(dimethylamino)phosphonium hexafluorophosphate) in DMF was further added to and fully mixed with the resulting solution by shaking. Further, a solution prepared by dissolving 0.14 ml of diisopropyl ethyl amine in DMF was added to and fully mixed with the obtained solution by shaking to obtain a slurry reagent.

The slurry reagent obtained as described above was left to stand at 4° C. for 12 hours. Thereafter, 50 ml of a DMF/methanol mixed solvent (volume ratio of 1/1) was added to and mixed with the reagent, and the resulting solution was centrifuged to discard the supernatant. Further, after the obtained product was washed with the above DMF/methanol mixed solution, it was washed with methanol and centrifuged to obtain a precipitate. After the precipitate was vacuum dried, it was dissolved in 50 mL of DMSO and the obtained transparent solution was added dropwise to 700 mL of water to precipitate polyrotaxane. The precipitated polyrotaxane was collected by centrifugal separation and vacuum dried. It was further dissolved in DMSO, precipitated in water, collected and dried to obtain purified polyrotaxane. The clathrate amount of α-CD at this point was 0.25.

(3) Introduction of Side Chain into Polyrotaxane;
500 mg of the above purified polyrotaxane was dissolved in 50 mL of a 1 mol/L NaOH aqueous solution, and 3.83 g (66 mmol) of propylene oxide was added to the resulting solution and stirred in an argon atmosphere at room temperature for 12 hours. Then, the above polyrotaxane solution was neutralized with a 1 mol/L HCl aqueous solution to achieve a pH of 7 to 8, dialyzed with a dialysis tube and freeze dried to obtain hydroxypropylated polyrotaxane. When the obtained hydroxypropylated polyrotaxane was identified by $^1$H-NMR and GPC, it was confirmed that the product was hydroxypropylated polyrotaxane having a desired structure.

The degree of modifying the OH groups of the cyclic molecules by a hydroxypropyl group was 0.5 and the weight average molecular weight Mw measured by GPC was 180,000.

A mixed solution was prepared by dissolving 5 g of the obtained hydroxypropylated polyrotaxane in 15.0 g of ε-caprolactone at 80° C. After this mixed solution was stirred at 110° C. for 1 hour while dry nitrogen was blown into this solution, 0.16 g of a 50 wt % xylene solution of tin (II) 2-ethylhexanoate was added to this solution and stirred at 130° C. for 6 hours. Thereafter, xylene was added to obtain a polycaprolactone modified polyrotaxane xylene solution having a nonvolatile content concentration of about 35 mass % into which side chains had been introduced.

(4) Preparation of OH Group Introduced Side Chain Modified Polyrotaxane;

The polycaprolactone modified polyrotaxane xylene solution prepared above was added dropwise to hexane, collected and dried to obtain side chain modified polyrotaxane having an OH group at the end of the side chain.

The physical properties of this OH group introduced side chain modified polyrotaxane are as follows.
Modification degree of side chain: 0.5 (50% in terms of %)
Molecular weight of side chain: about 400 on average
Weight average molecular weight Mw (GPC) of polyrotaxane: 180,000

(5) Preparation of Acrylate Group Introduced Side Chain Modified Polyrotaxane Monomer (T15)

The OH group introduced side chain modified polyrotaxane prepared in the above Production Example (4) was used. 10.0 g of the OH group introduced side chain modified polyrotaxane was dissolved in 50 ml of methyl ethyl ketone, 5 mg of dibutyl hydroxy toluene (polymerization inhibitor) was added to the resulting solution, and 1.85 g of 2-acryloyloxyethyl isocyanate was added dropwise to the obtained solution. 10 mg of dibutyltin dilaurate as a catalyst was added to the resulting solution and stirred at 70° C. for 4 hours to obtain a methyl ethyl ketone solution of polyrotaxane in which an acrylate group had been introduced at the end of polycaprolactone. This solution was added dropwise to hexane, and the precipitated solid was collected and dried to obtain a polyrotaxane monomer (T15) in which an acrylate group as a polymerizable group had been introduced into the side chain.

This acrylate group introduced side chain modified polyrotaxane monomer (T15) was used as the component (C2-3). The physical properties of this monomer are as follows.
Molecular weight of side chain: about 400 on average
Weight average molecular weight Mw of polyrotaxane monomer (GPC): 200,000
Modification rate of acrylate group: 81 mol % Ratio of remaining OH group: 19 mol %

<Preparation of Hard Coat Agent>

A hard coat agent 1 was prepared by the following method.

Production of Hard Coat Agent 1

13.86 parts by mass of γ-glycidoxyethyl trimethoxysilane, 11.16 parts by mass of methyl triethoxysilane, 0.059 part by mass of a silicone-based surfactant (L7001 of Dow Corning Toray Co., Ltd.), 4.2 parts by mass of ethylene glycol isopropyl ether, 2.98 parts by mass of acetyl acetone and 9.77 parts by mass of t-butyl alcohol were added and mixed together under agitation for 30 minutes. 5.84 parts by mass of a 0.05 N hydrochloric acid aqueous solution was added carefully to ensure that the liquid temperature did not exceed 50° C. while the obtained solution was stirred and kept stirred for 1 hour after the end of addition. Subsequently, 46.69 parts by mass of methanol dispersed silica sol (manufactured by Nissan Chemical Industries, Ltd.) as an inorganic oxide fine particle was added to the resulting solution and stirred for 30 minutes. Thereafter, 0.54 part by mass of tris(2,4-pentanedionato)aluminum (III) as a curing catalyst was added to and mixed with the solution under agitation. Then, 1.4 parts by mass of ethylene glycol isopropyl ether and 0.14 part by mass of 3-aminopropyl trimethoxysilane were added to and mixed with the obtained solution under agitation at room temperature for 3 hours. The obtained mixed solution was designated as the hard coat agent 1.

Example 1

Production and Evaluation of Photochromic Cured Body 0.04 part by mass of PC1 as the photochromic compound component (B) and 1 part by mass of ND as a polymerization initiator were added to and fully mixed with a mixture of polymerizable monomers consisting of 1 part by mass of OXE-30 as the component (A), 4.5 parts by mass of A-200, 1.8 parts by mass of A-400, 40.5 parts by mass of 4G and 0.5 part by mass of 14G as the components (C1-1), 26.1 parts by mass of BPE100 and 0.5 part by mass of A-BPE-10 as the components (C1-2), 9.3 parts by mass of TMPT as the component (C2-1), and 7.2 parts by mass of αMS and 1.8 parts by mass of MSD as other monomer components to produce a photochromic curable composition. The amount of each component is shown in Table 1.

This photochromic curable composition which was a mixed solution was injected into a casting mold composed of a glass plate and a gasket made of an ethylene-vinyl acetate copolymer to polymerize substantially all the amounts of the above monomers by cast polymerization. Polymerization was carried out by using an air furnace, gradually raising the temperature from 30 to 85° C. over 18 hours and keeping the temperature at 85° C. for 2 hours. After the end of polymerization, the cured body was taken out from the glass mold of the cast mold to obtain a photochromic cured body (thickness of 2 mm). The photochromic properties, storage stability and durability of the obtained photochromic cured body were evaluated. The evaluation results are shown in Table 2.

<Coating and Curing a Hard Coat Layer on Photochromic Cured Body>

The photochromic cured body produced by the above method was immersed in a 50° C. 20 mass % sodium hydroxide aqueous solution to carry out alkali etching using a ultrasonic cleaning device for 5 minutes. After alkali etching, it was washed with tap water and then with 50° C. distilled water to remove a residual alkali matter and then left for about 10 minutes until its temperature became room temperature. The hard coat agent 1 prepared by the above method was dip coated on this lens substrate (photochromic cured body) at 25° C. and a pulling-up speed of 15 cm/min. After it was pre-cured in a 70° C. oven for 15 minutes, it was cured at 110° C. for 3 hours to obtain an optical article (hard coat lens) having a 2.1 μm-thick hard coat layer on both sides of the photochromic cured body. The boiling adhesion of the obtained hard coat lens was evaluated and the result is shown in Table 2.

Reference Example 1, Comparative Example 1

A photochromic cured body was produced in the same manner as in Example 1 except that a photochromic curable composition having composition shown in Table 1 was prepared so as to evaluate its photochromic properties, storage stability and durability. A hard coat lens was produced by using the obtained photochromic cured body to carry out a boiling adhesion test in the same manner as in Example 1. The results are shown in Table 2.

TABLE 1

| No. | (A) (pbm) | (B) (pbm) | (C1-1) (pbm) | (C1-2) (pbm) | (C2-1) (pbm) | (C3) (pbm) | Other monomer (pbm) | Initiator (pbm) |
|---|---|---|---|---|---|---|---|---|
| Ex. 1 | OXE-30 (1) | PCl (0.04) | A-200 (4.5) A-400 (1.8) 4G (40.5) 14G (0.5) | KT50 (8.5) BPE100 (26.1) A-BPE-10 (0.5) | TMPT (9.3) | — | αMS (7.2) MSD (1.8) | ND (1) |
| R. Ex. 1 | — | PCl (0.04) | A-200 (4.5) A-400 (1.8) 4G (40.5) 14G (0.5) | KT50 (8.5) BPE100 (26.1) A-BPE-10 (0.5) | TMPT (9.3) | GMA (1) | αMS (7.2) MSD (1.8) | ND (1) |
| C. Ex. | — | PCl (0.04) | A-200 (4.5) A-400 (1.8) 4G (40.5) 14G (0.5) | KT50 (8.5) BPE100 (26.1) A-BPE-10 (0.5) | TMPT (9.3) | — | αMS (7.2) MSD (1.8) | ND (1) |

Ex.: Example, R. Ex.: Reference Example, C. Ex.: Comparative Example, pbm: part by mass

TABLE 2

| No. | Maximum absorption wavelength (nm) | Color optical density (Abs.) | Fading speed (sec) | Boiling adhesion of hard coat | | | | | Lens storage stability Δa* | Durability residual rate (%) |
|---|---|---|---|---|---|---|---|---|---|---|
| | | | | Initial | 1 hr. of boiling | 2 hrs. of boiling | 3 hrs. of boiling | 4 hrs. of boiling | | |
| Ex. 1 | 581 | 0.94 | 45 | 100/100 | 100/100 | 100/100 | 100/100 | 99/100 | 0.0 | 88 |
| R. Ex. 1 | 580 | 0.93 | 44 | 100/100 | 100/100 | 100/100 | 100/100 | 95/100 | 0.1 | 89 |
| C. Ex. 1 | 579 | 0.90 | 50 | 100/100 | 100/100 | 100/100 | 100/100 | 95/100 | 0.1 | 87 |

Ex.: Example, R. Ex.: Reference Example, C. Ex.: Comparative Example
hr.: hour
hrs.: hours Example 2

Production and Evaluation of Photochromic Laminate 0.25 part by mass of PC2, 1.4 parts by mass of PC3, 0.8 part by mass of PC4, 0.15 part by mass of PC5 and 0.3 part by mass of PC6 as the photochromic compound components (B), 3 parts by mass of HALS and 1 part by mass of HP as stabilizers, 0.3 part by mass of PI as a polymerization initiator and 0.1 part by mass of L7001 as a leveling agent were added to and fully mixed with a mixture of polymerizable monomers consisting of 1 part by mass of OXE-30 as the component (A), 45 parts by mass of 14G as the component (C1-1), 11 parts by mass of A-PC as the component (C1-2), 40 parts by mass of TMPT as the component (C2-1), 3 parts by mass of T15 as the component (C2-3) and 6.5 parts by mass of TSL8370 as the component (C3) to produce a photochromic curable composition. The amount of each component is shown in Table 3.

A photochromic laminate was obtained by using the photochromic curable composition which was a mixed solution in accordance with the lamination method. The polymerization method is described below.

A thiourethane-based plastic lens having a center thickness of 2 mm and a refractive index of 1.60 was first prepared as an optical substrate. This thiourethane-based plastic lens was alkali etched by using a 10% sodium hydroxide aqueous solution at 50° C. for 5 minutes and then fully washed with distilled water in advance.

A moisture-curable primer (trade name; TR-SC-P, manufactured by Tokuyama Corporation) was coated on the surface of the above plastic lens by using a spin coater (1H-DX2 manufactured by MIKASA) at a revolution speed of 70 rpm for 15 seconds and then at 1,000 rpm for 10 seconds. Thereafter, about 2 g of the photochromic composition obtained above was spin coated at a revolution speed of 60 rpm for 40 seconds and then at 600 rpm for 10 to 20 seconds to form a photochromic coating layer having a thickness of 40 μm.

The lens coated with this coating agent on the surface was irradiated with light from a metal halide lamp having an output of 200 mW/cm$^2$ in a nitrogen gas atmosphere for 90 seconds to cure the coating film. Thereafter, the lens was further heated at 110° C. for 1 hour to manufacture a photochromic laminate having a photochromic layer. The photochromic properties, storage stability and durability of the obtained photochromic laminate were evaluated. The evaluation results are shown in Table 4.

A hard coat layer was formed on the obtained photochromic laminate in the same manner as in Example 1 to obtain a hard coat lens. A boiling adhesion test was made on the obtained hard coat lens. The result is shown in Table 4.

Reference Example 2, Comparative Example 2

Photochromic laminates were manufactured in the same manner as in Example 2 except that photochromic curable compositions having composition shown in Table 3 were prepared so as to evaluate their photochromic properties, storage stability and durability. Hard coat lenses were manufactured by using the obtained photochromic laminates, and a boiling adhesion test was made on the hard coat lenses in the same manner as in Example 2. The results are shown in Table 4.

stabilizers, 0.25 part by mass of PI as a polymerization initiator and 0.1 part by mass of L7001 as a leveling agent were added to and fully mixed with a mixture of polymerizable monomers consisting of 1 part by mass of OXE-30 as the component (A), 25 parts by mass of 14G as the component (C1-1), 10 parts by mass of A-PC and 35 parts by mass of KT50 as the components (C1-2), 24 parts by mass of TMPT as the component (C2-1), 5 parts by mass of S21 as the component (C2-4) and 6.5 parts by mass of TSL8370 as the component (C3) to produce a photochromic curable composition. The amount of each component is shown in Table 5.

A photochromic laminate was obtained by the lamination method in the same manner as in Example 2 except that the

TABLE 3

| No. | (A) (pbm) | (B) (pbm) | (C1-1) (pbm) | (C1-2) (pbm) | (C2-1) (pbm) | (C2-3) (pbm) | (C3) (pbm) | Additives (pbm) | Initiator (pbm) |
|---|---|---|---|---|---|---|---|---|---|
| Ex. 2 | OXE-30 (1) | PC2 (0.25) PC3 (1.4) PC4 (0.8) PC5 (0.15) PC6 (0.3) | 14G (45) | A-PC (11) | TMPT (40) | T15 (3) | TSL8370 (6.5) | HALS (3) HP (1) L7001 (0.1) | PI (0.3) |
| R. Ex. 2 | — | PC2 (0.25) PC3 (1.4) PC4 (0.8) PC5 (0.15) PC6 (0.3) | 14G (45) | A-PC (11) | TMPT (40) | T15 (3) | TSL8370 (6.5) GMA (1) | HALS (3) HP (1) L7001 (0.1) | PI (0.3) |
| C. Ex. 2 | — | PC2 (0.25) PC3 (1.4) PC4 (0.8) PC5 (0.15) PC6 (0.3) | 14G (45) | A-PC (11) | TMPT (40) | T15 (3) | TSL8370 (6.5) | HALS (3) HP (1) L7001 (0.1) | PI (0.3) |

Ex.: Example, R. Ex: Reference Example, C. Ex.: Comparative Example, pbm: part by mass

TABLE 4

| No. | Maximum absorption wavelength (nm) | Color optical density (Abs.) | Fading speed (sec) | Boiling adhesion of hard coat | | | | | Lens storage stability Δa* | Durability residual rate (%) |
|---|---|---|---|---|---|---|---|---|---|---|
| | | | | Initial | 1 hr. of boiling | 2 hrs. of boiling | 3 hrs. of boiling | 4 hrs. of boiling | | |
| Ex. 2 | 575 | 0.89 | 83 | 100/100 | 100/100 | 100/100 | 100/100 | 100/100 | 0.1 | 76 |
| R. Ex. 2 | 579 | 0.88 | 82 | 100/100 | 100/100 | 100/100 | 100/100 | 100/100 | 0.1 | 77 |
| C. Ex. 2 | 574 | 0.89 | 81 | 100/100 | 100/100 | 100/100 | 100/100 | 100/100 | 0.2 | 75 |

Ex.: Example, R. Ex.: Reference Example, C. Ex.: Comparative Example
hr.: hour
hrs.: hours Example 3

Production and Evaluation of Photochromic Laminate 0.25 part by mass of PC2, 1.4 parts by mass of PC3, 0.8 part by mass of PC4, 0.15 part by mass of PC5 and 0.3 part by mass of PC6 as the photochromic compound components (B), 3 parts by mass of HALS and 3 parts by mass of HP as above photochromic curable composition which was a mixed solution was used. The photochromic properties, storage stability and durability of the obtained photochromic laminate were evaluated. The evaluation results are shown in Table 6.

A hard coat layer was laminated on the obtained photochromic laminate in the same manner as in Example 1 to obtain a hard coat lens. A boiling adhesion test was made on the obtained hard coat lens. The result is shown in Table 6.

Reference Example 3, Comparative Example 3

Photochromic laminates were manufactured in the same manner as in Example 3 except that photochromic curable compositions having composition shown in Table 5 were used so as to evaluate their photochromic properties, storage stability and durability. Hard coat lenses were manufactured by using the obtained photochromic laminates, and a boiling adhesion test was made on the hard coat lenses in the same manner as in Example 2. The results are shown in Table 6.

OXE-30 as the component (A), 5 parts by mass of A-200 and 32 parts by mass of 4G as the components (C1-1), 5 parts by mass of KT50 and 49 parts by mass of BPE100 as the components (C1-2), 8 parts by mass of TMPT as the component (C2-1), and 9 parts by mass of αMS and 2 parts by mass of MSD as other monomer components to produce a photochromic curable composition. The amount of each component is shown in Table 7.

A photochromic cured body (thickness of 2 mm) was obtained in the same manner as in Example 1 except that the above photochromic curable composition which was a

TABLE 5

| No. | (A) (pbm) | (B) (pbm) | (C1-1) (pbm) | (C1-2) (pbm) | (C2-1) (pbm) | (C2-4) (pbm) | (C3) (pbm) | Additives (pbm) | Initiator (pbm) |
|---|---|---|---|---|---|---|---|---|---|
| Ex. 3 | OXE-30 (1) | PC2 (0.25) PC3 (1.4) PC4 (0.8) PC5 (0.15) PC6 (0.3) | 14G (25) | A-PC (10) KT50 (35) | TMPT (24) | S21 (5) | TSL8370 (6.5) | HALS (3) HP (3) L7001 (0.1) | PI (0.25) |
| R. Ex. 3 | — | PC2 (0.25) PC3 (1.4) PC4 (0.8) PC5 (0.15) PC6 (0.3) | 14G (25) | A-PC (10) KT50 (35) | TMPT (24) | S21 (5) | TSL8370 (6.5) GMA (1) | HALS (3) HP (3) L7001 (0.1) | PI (0.25) |
| C. Ex. 3 | — | PC2 (0.25) PC3 (1.4) PC4 (0.8) PC5 (0.15) PC6 (0.3) | 14G (25) | A-PC (10) KT50 (35) | TMPT (24) | S21 (5) | TSL8370 (6.5) | HALS (3) HP (3) L7001 (0.1) | PI (0.25) |

Ex.: Example, R. Ex.: Reference Example, C. Ex.: Comparative Example, pbm: part by mass

TABLE 6

| No. | Maximum absorption wavelength (nm) | Color optical density (Abs.) | Fading speed (sec) | Boiling adhesion of hard coat | | | | | Lens storage stability Δa* | Durability residual rate (%) |
|---|---|---|---|---|---|---|---|---|---|---|
| | | | | Initial | 1 hr. of boiling | 2 hrs. of boiling | 3 hrs. of boiling | 4 hrs. of boiling | | |
| Ex. 3 | 578 | 0.92 | 107 | 100/100 | 100/100 | 100/100 | 100/100 | 100/100 | 0.0 | 79 |
| R. Ex. 3 | 577 | 0.92 | 109 | 100/100 | 100/100 | 100/100 | 100/100 | 100/100 | 0.1 | 79 |
| C. Ex. 3 | 581 | 0.90 | 115 | 100/100 | 100/100 | 100/100 | 100/100 | 90/100 | 0.1 | 77 |

Ex.: Example, R. Ex.: Reference Example, C. Ex.: Comparative Example
hr.: hour
hrs.: hours Example 4

Production and Evaluation of Photochromic Cured Body 0.04 part by mass of PC7 as the photochromic compound component (B) and 1 part by mass of ND as a polymerization initiator were added to and fully mixed with a mixture of polymerizable monomers consisting of 1 part by mass of mixed solution was used. The photochromic properties, storage stability and durability of the obtained photochromic cured body were evaluated. The evaluation results are shown in Table 8.

A hard coat layer was laminated on the obtained photochromic cured body in the same manner as in Example 1 to obtain a hard coat lens. A boiling adhesion test was made on the obtained hard coat lens. The results are shown in Table 8.

Examples 5 to 7, Comparative Example 4, Reference Examples 4 to 7

Photochromic cured bodies were manufactured in the same manner as in Example 4 except that photochromic curable compositions having composition shown in Table 7 were prepared so as to evaluate their photochromic properties, storage stability and durability. Hard coat lenses were manufactured by using the obtained photochromic laminates, and a boiling adhesion test was made on these hard coat lenses in the same manner as in Example 4. The results are shown in Table 8.

as the component (C1-1), 11.5 parts by mass of A-PC as the component (C1-2) and 41 parts by mass of TMPT as the component (C2-1) to produce a photochromic curable composition. The amount of each component is shown in Table 9.

A photochromic laminate was obtained by the lamination method in the same manner as in Example 2 except that the above photochromic curable composition which was a mixed solution was used. The photochromic properties, storage stability and durability of the obtained photochromic laminate were evaluated. The evaluation results are shown in Table 10.

A hard coat layer was formed on the obtained photochromic laminate in the same manner as in Example 1 to obtain

TABLE 7

| No. | (A) (pbm) | (B) (pbm) | (C1-1) (pbm) | (C1-2) (pbm) | (C2-1) (pbm) | (C3) (pbm) | Other monomer (pbm) | Initiator (pbm) |
|---|---|---|---|---|---|---|---|---|
| Ex. 4 | OXE-30 (1) | PC7 (0.04) | A-200 (5) 4G (32) | KT50 (5) BPE100 (49) | TMPT (8) | — | αMS (9) MSD (2) | ND (1) |
| Ex. 5 | OXE-30 (3) | PC7 (0.04) | A-200 (5) 4G (30) | KT50 (5) BPE100 (49) | TMPT (8) | — | αMS (9) MSD (2) | ND (1) |
| Ex. 6 | OXE-30 (5) | PC7 (0.04) | A-200 (5) 4G (28) | KT50 (5) BPE100 (49) | TMPT (8) | — | αMS (9) MSD (2) | ND (1) |
| Ex. 7 | OXE-30 (10) | PC7 (0.04) | A-200 (5) 4G (23) | KT50 (5) BPE100 (49) | TMPT (8) | — | αMS (9) MSD (2) | ND (1) |
| C. Ex. 4 | — | PC7 (0.04) | A-200 (5) 4G (33) | KT50 (5) BPE100 (49) | TMPT (8) | — | αMS (9) MSD (2) | ND (1) |
| R. Ex. 4 | — | PC7 (0.04) | A-200 (5) 4G (32) | KT50 (5) BPE100 (49) | TMPT (8) | GMA (1) | αMS (9) MSD (2) | ND (1) |
| R. Ex. 5 | — | PC7 (0.04) | A-200 (5) 4G (30) | KT50 (5) BPE100 (49) | TMPT (8) | GMA (3) | αMS (9) MSD (2) | ND (1) |
| R. Ex. 6 | — | PC7 (0.04) | A-200 (5) 4G (28) | KT50 (5) BPE100 (49) | TMPT (8) | GMA (5) | αMS (9) MSD (2) | ND (1) |
| R. Ex. 7 | — | PC7 (0.04) | A-200 (5) 4G (23) | KT50 (5) BPE100 (49) | TMPT (8) | GMA (10) | αMS (9) MSD (2) | ND (1) |

Ex.: Example, R. Ex.: Reference Example, C. Ex.: Comparative Example, pbm: part by mass

TABLE 8

| No. | Maximum absorption wavelength (nm) | Color optical density (Abs.) | Fading speed (sec) | Boiling adhesion of hard coat | | | | | Lens storage stability Δa* | Durability residual rate (%) |
|---|---|---|---|---|---|---|---|---|---|---|
| | | | | Initial | 1 hr. of boiling | 2 hrs. of boiling | 3 hrs. of boiling | 4 hrs. of boiling | | |
| Ex. 4 | 581 | 0.92 | 51 | 100/100 | 100/100 | 100/100 | 100/100 | 100/100 | 0.0 | 81 |
| Ex. 5 | 582 | 0.91 | 54 | 100/100 | 100/100 | 100/100 | 100/100 | 100/100 | 0.1 | 82 |
| Ex. 6 | 584 | 0.92 | 54 | 100/100 | 100/100 | 100/100 | 100/100 | 98/100 | 0.2 | 81 |
| Ex. 7 | 583 | 0.88 | 59 | 100/100 | 100/100 | 100/100 | 100/100 | 99/100 | 0.1 | 82 |
| C. Ex. 4 | 581 | 0.89 | 60 | 100/100 | 100/100 | 100/100 | 100/100 | 90/100 | 0.2 | 79 |
| R. Ex. 4 | 580 | 0.92 | 56 | 100/100 | 100/100 | 100/100 | 100/100 | 95/100 | 0.1 | 80 |
| R. Ex. 5 | 581 | 0.89 | 58 | 100/100 | 100/100 | 100/100 | 100/100 | 95/100 | 0.2 | 82 |
| R. Ex. 6 | 582 | 0.87 | 62 | 100/100 | 100/100 | 100/100 | 100/100 | 96/100 | 0.7 | 81 |
| R. Ex. 7 | 580 | 0.84 | 67 | 100/100 | 100/100 | 100/100 | 100/100 | 94/100 | 3.2 | 80 |

Ex.: Example, R. Ex.: Reference Example, C. Ex.: Comparative Example
hr.: hour
hrs.: hours Example 8

Production and Evaluation of Photochromic Laminate 0.5 part by mass of PC7 as the photochromic compound component (B), 3 parts by mass of HALS and 1 part by mass of HP as stabilizers, 0.3 part by mass of PI as a polymerization initiator and 0.1 part by mass of L7001 as a leveling agent were added to and fully mixed with a mixture of polymerizable monomers consisting of 1 part by mass of OXE-30 as the component (A), 46.5 parts by mass of 14G a hard coat lens. A boiling adhesion test was made on the obtained hard coat lens. The result is shown in Table 10.

Examples 9 to 11, Comparative Example 5, Reference Examples 8 to 11

Photochromic laminates were manufactured in the same manner as in Example 8 except that photochromic curable compositions having composition shown in Table 9 were prepared so as to evaluate their photochromic properties and storage stability. Hard coat lenses were manufactured by using the obtained photochromic laminates, and a boiling adhesion test was made on these hard coat lenses in the same manner as in Example 2. The results are shown in Table 10.

TABLE 9

| No. | (A) (pbm) | (B) (pbm) | (C1-1) (pbm) | (C1-2) (pbm) | (C2-1) (pbm) | (C3) (pbm) | Additives (pbm) | Initiator (pbm) |
|---|---|---|---|---|---|---|---|---|
| Ex. 8 | OXE-30 (1) | PC7 (0.05) | 14G (46.5) | A-PC (11.5) | TMPT (41) | — | HALS (3) HP (1) L7001 (0.1) | PI (0.3) |
| Ex. 9 | OXE-30 (3) | PC7 (0.05) | 14G (45.5) | A-PC (11) | TMPT (40.5) | — | HALS (3) HP (1) L7001 (0.1) | PI (0.3) |
| Ex. 10 | OXE-30 (5) | PC7 (0.05) | 14G (44.5) | A-PC (11) | TMPT (39.5) | — | HALS (3) HP (1) L7001 (0.1) | PI (0.3) |
| Ex. 11 | OXE-30 (10) | PC7 (0.05) | 14G (42) | A-PC (10.5) | TMPT (37.5) | — | HALS (3) HP (1) L7001 (0.1) | PI (0.3) |
| C. Ex. 5 | — | PC7 (0.05) | 14G (47) | A-PC (11.5) | TMPT (41.5) | — | HALS (3) HP (1) L7001 (0.1) | PI (0.3) |
| R. Ex. 8 | — | PC7 (0.05) | 14G (46.5) | A-PC (11.5) | TMPT (41) | GMA (1) | HALS (3) HP (1) L7001 (0.1) | PI (0.3) |
| R. Ex. 8 | — | PC7 (0.05) | 14G (45.5) | A-PC (11) | TMPT (40.5) | GMA (3) | HALS (3) HP (1) L7001 (0.1) | PI (0.3) |
| R. Ex. 10 | — | PC7 (0.05) | 14G (44.5) | A-PC (11) | TMPT (39.5) | GMA (5) | HALS (3) HP (1) L7001 (0.1) | PI (0.3) |
| R. Ex. 11 | — | PC7 (0.05) | 14G (43) | A-PC (10.5) | TMPT (37.5) | GMA (10) | HALS (3) HP (1) L7001 (0.1) | PI (0.3) |

Ex.: Example, R. Ex.: Reference Example, C. Ex.: Comparative Example, pbm: part by mass

TABLE 10

| No. | Maximum absorption wavelength (nm) | Color optical density (Abs.) | Fading speed (sec) | Boiling adhesion of hard coat | | | | | Lens storage stability Δa* | Durability residual rate (%) |
| | | | | Initial | 1 hr. of boiling | 2 hrs. of boiling | 3 hrs. of boiling | 4 hrs. of boiling | | |
|---|---|---|---|---|---|---|---|---|---|---|
| Ex. 8 | 578 | 0.53 | 38 | 100/100 | 100/100 | 100/100 | 100/100 | 100/100 | 0.0 | 16 |
| Ex. 9 | 581 | 0.50 | 40 | 100/100 | 100/100 | 100/100 | 100/100 | 100/100 | 0.1 | 17 |
| Ex. 10 | 580 | 0.51 | 40 | 100/100 | 100/100 | 100/100 | 100/100 | 100/100 | 0.0 | 20 |
| Ex. 11 | 583 | 0.50 | 43 | 100/100 | 100/100 | 100/100 | 100/100 | 100/100 | 0.1 | 24 |
| c. Ex. 5 | 579 | 0.50 | 44 | 100/100 | 100/100 | 100/100 | 100/100 | 92/100 | 0.2 | 16 |
| R. Ex. 8 | 579 | 0.52 | 40 | 100/100 | 100/100 | 100/100 | 100/100 | 100/100 | 0.1 | 17 |
| R. Ex. 9 | 584 | 0.51 | 40 | 100/100 | 100/100 | 100/100 | 100/100 | 99/100 | 0.2 | 16 |
| R. Ex. 10 | 577 | 0.50 | 41 | 100/100 | 100/100 | 100/100 | 100/100 | 100/100 | 0.3 | 17 |
| R. Ex. 11 | 578 | 0.51 | 42 | 100/100 | 100/100 | 100/100 | 100/100 | 98/100 | 0.7 | 18 |

Ex.: Example, R. Ex.: Reference Example, C. Ex.: Comparative Example
hr.: hour
hrs.: hours

The invention claimed is:

1. A photochromic curable composition comprising (A) a radically polymerizable monomer having at least one oxetanyl group in one molecule, (B) a photochromic compound and (C) radically polymerizable monomers other than the component (A), wherein an amount of the photochromic compound (B) is 1 to 400 parts by mass based on 100 parts by mass of the component (A), wherein an amount of the component (A) is 0.1 to 5 parts by mass based on 100 parts by mass of the total of the component (C), wherein an amount of the photochromic compound (B) is 0.001 to 10 parts by mass based on 100 parts by mass of the total of the component (C), wherein the component (A) is represented by the following formula (3);

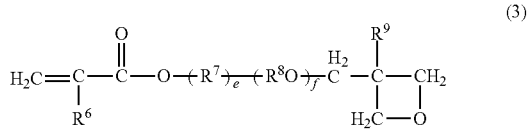

(3)

in the above formula, $R^6$ is a hydrogen atom or methyl group, $R^7$ and $R^8$ are each independently a linear or branched alkylene group having 1 to 4 carbon atoms, $R^9$ is a linear or branched alkyl group having 1 to 4 carbon atoms, and "e" and "f" are each an average value of 0 to 20.

2. The photochromic curable composition according to claim 1, wherein the component (C) comprises (C1) a bifunctional (meth)acrylate monomer having two (meth)acrylate groups in one molecule and (C2) a polyfunctional (meth)acrylate monomer having at least three (meth)acrylate groups in one molecule.

3. The photochromic curable composition according to claim 2, wherein the component (C1) comprises (C1-1) a polyalkylene glycol di(meth)acrylate monomer represented by the following formula (1);

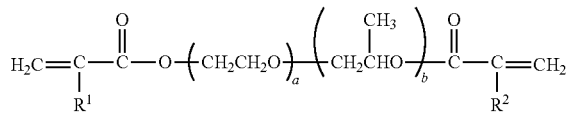
(1)

in the above formula, $R^1$ and $R^2$ are each a hydrogen atom or methyl group, "a" and "b" are each an integer of 0 or more, and (a+b) is an integer of 2 or more, and the component (C2) comprises Component (C2-1) a polyfunctional (meth)acrylate monomer represented by the following formula (2);

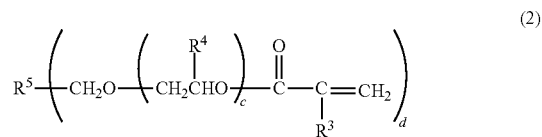
(2)

in the above formula, $R^3$ is a hydrogen atom or methyl group, $R^4$ is a hydrogen atom or alkyl group having 1 to 2 carbon atoms, $R^5$ is a carbon atom, trivalent to hexavalent hydrocarbon group having 1 to 10 carbon atoms, or trivalent to hexavalent organic group having 1 to 10 carbon atoms and containing an oxygen atom in the chain, "c" is an average value of 0 to 3, and "d" is an integer of 3 to 6.

4. A cured body obtained by curing the photochromic curable composition of claim 1.

5. A photochromic laminate having the cured body of claim 4 laminated on an optical substrate.

6. The photochromic curable composition according to claim 1, wherein the photochromic curable composition does not comprise glycidyl methacrylate.

* * * * *